United States Patent

[11] 3,628,451

| [72] | Inventors | Hearst McClellan<br>Henrico County;<br>Daniel S. Cvacho, Chesterfield County,<br>both of Va. |
|---|---|---|
| [21] | Appl. No. | 827,310 |
| [22] | Filed | May 23, 1969 |
| [45] | Patented | Dec. 21, 1971 |
| [73] | Assignee | Reynolds Metals Company<br>Richmond, Va. |

[54] APPARATUS FOR AND METHOD OF SHAPING WORKPIECES
34 Claims, 21 Drawing Figs.

[52] U.S. Cl. ..................................... 101/4,
101/32, 101/35, 198/22 R, 198/25, 198/33 R,
214/1 B
[51] Int. Cl. ..................................... B44b 5/00,
B41f 17/20
[50] Field of Search .......................... 101/4, 5, 7,
11, 35, 32, 38–40; 198/33 R, 22, 25; 214/1 B

[56] References Cited
UNITED STATES PATENTS

| 741,914 | 10/1903 | Kirschbaum .................. | 101/4 |
| 1,892,545 | 12/1932 | Ward ............................ | 101/7 |
| 2,002,698 | 5/1935 | Kruczek ....................... | 101/35 |
| 2,344,930 | 3/1944 | Ferguson...................... | 101/5 |
| 2,635,533 | 4/1953 | Stewart ........................ | 101/40 |
| 2,679,204 | 5/1954 | Hockenberger et al. ...... | 101/5 |
| 2,770,347 | 11/1956 | Porterfield ................... | 101/40 UX |
| 2,939,386 | 6/1960 | Norris et al. .................. | 101/7 X |
| 3,066,784 | 12/1962 | Remington et al............ | 101/35 UX |
| 3,097,593 | 7/1963 | Makowski et al............. | 101/38 |
| 3,261,281 | 7/1966 | Hartmeister.................. | 101/40 X |
| 3,405,633 | 10/1968 | Price, Jr. et al. .............. | 101/38 UX |
| 3,496,863 | 2/1970 | Cvacho et al................. | 101/40 |

FOREIGN PATENTS

| 1,137,712 | 12/1968 | Great Britain................ | 101/38 |

*Primary Examiner*—Robert E. Pulfrey
*Assistant Examiner*—Clifford D. Crowder
*Attorney*—Glenn, Palmer, Lyne, Gibbs & Thompson ABSTRACT: An apparatus for and method of serially embossing workpieces, such as cans, wherein each can is precisely fed to an infeed station where it is grasped while maintaining its sidewall completely accessible and then sequentially indexed to a plurality of stations including an embossing station for precision embossing of its sidewall.

PATENTED DEC 21 1971 3,628,451

INVENTORS
HEARST McCLELLAN
DANIEL S. CVACHO
BY Glenn, Palmer, Lyne,
Gibbs & Thompson

THEIR ATTORNEYS

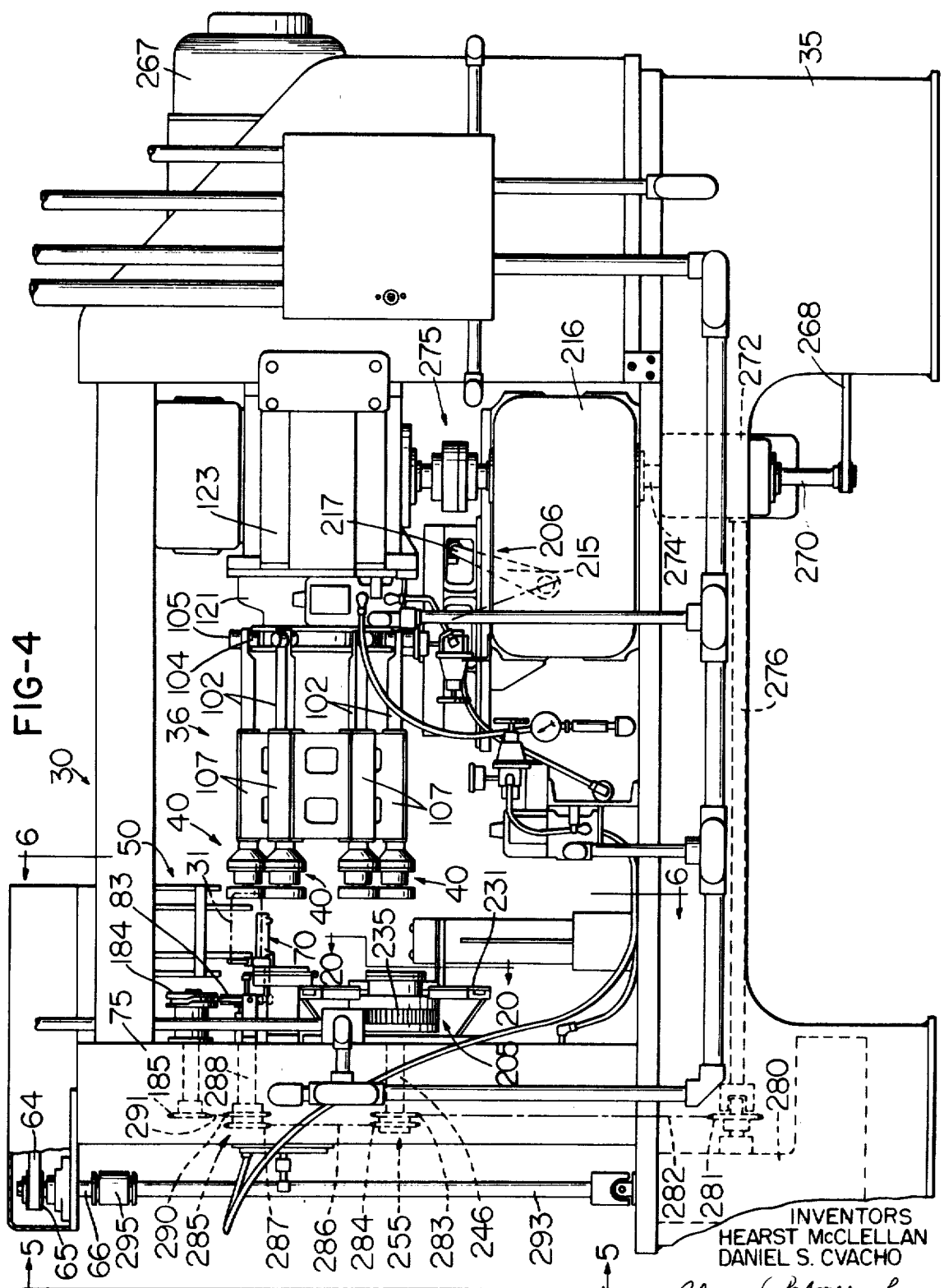

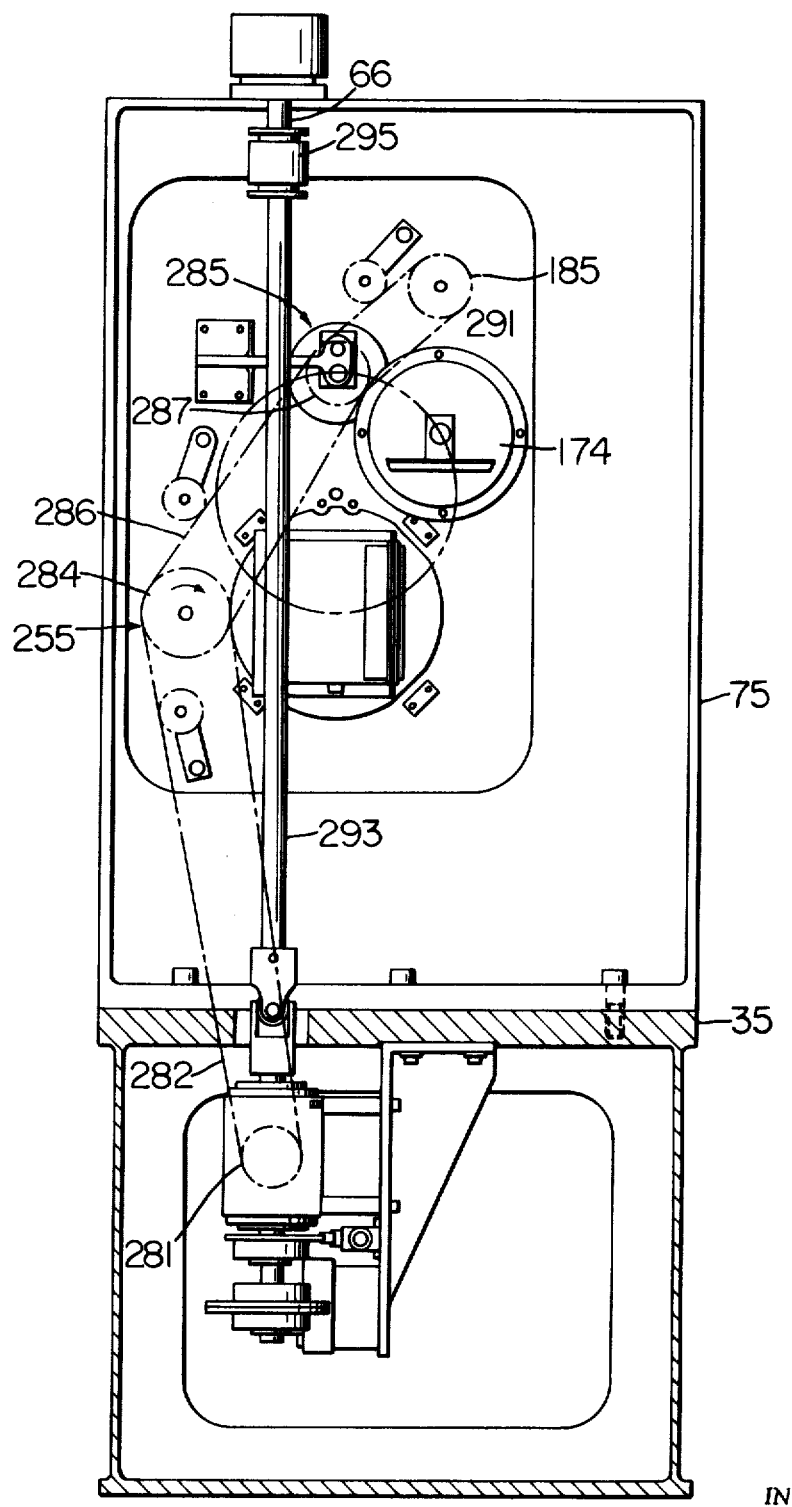

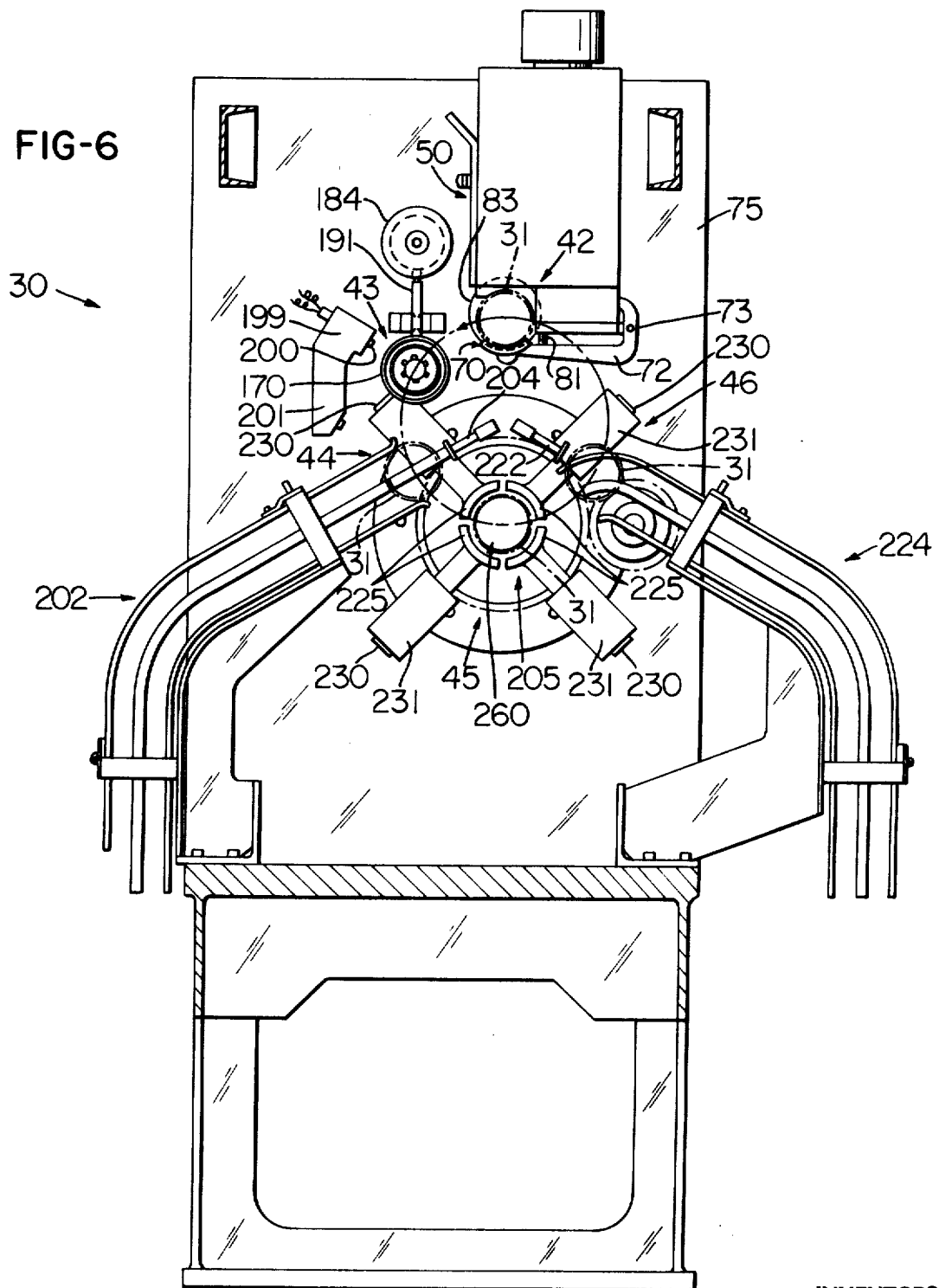

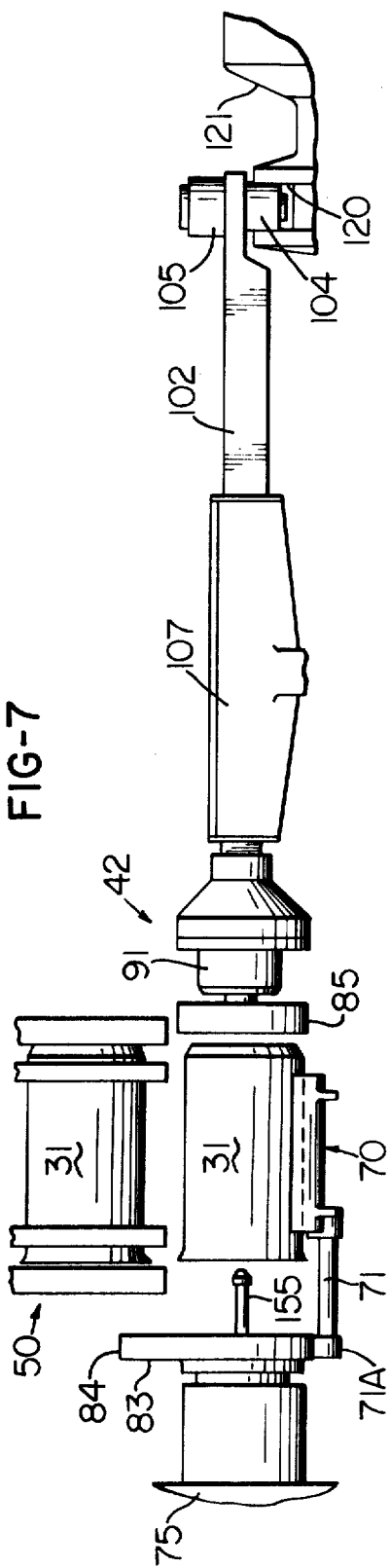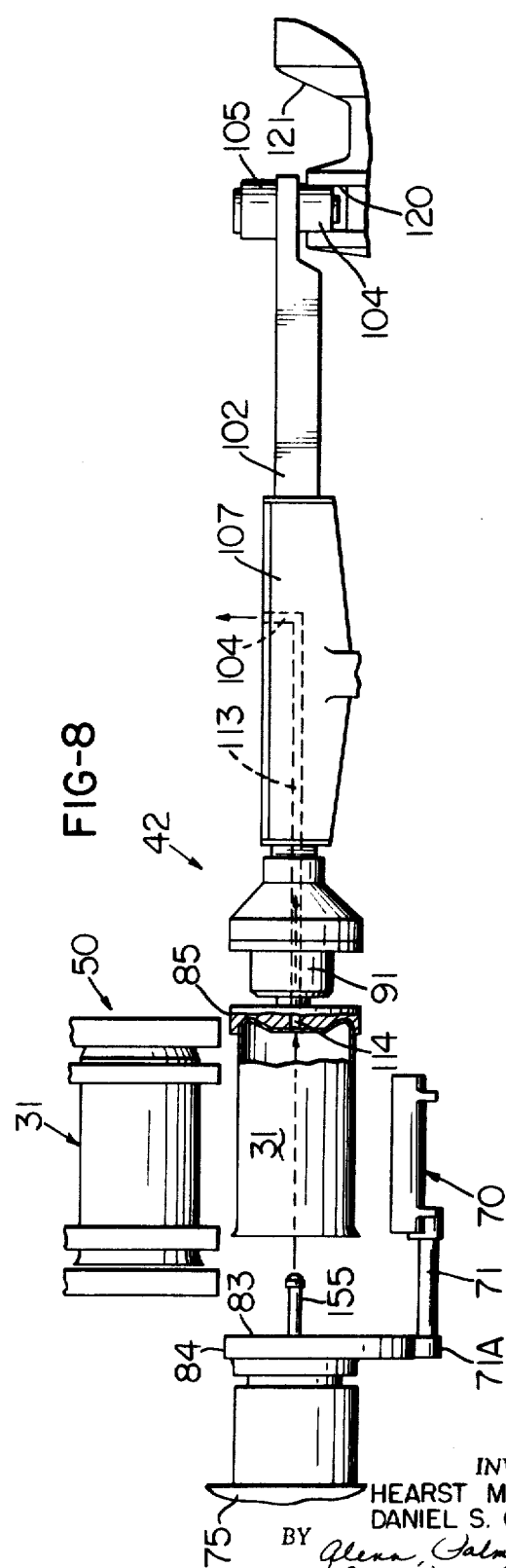

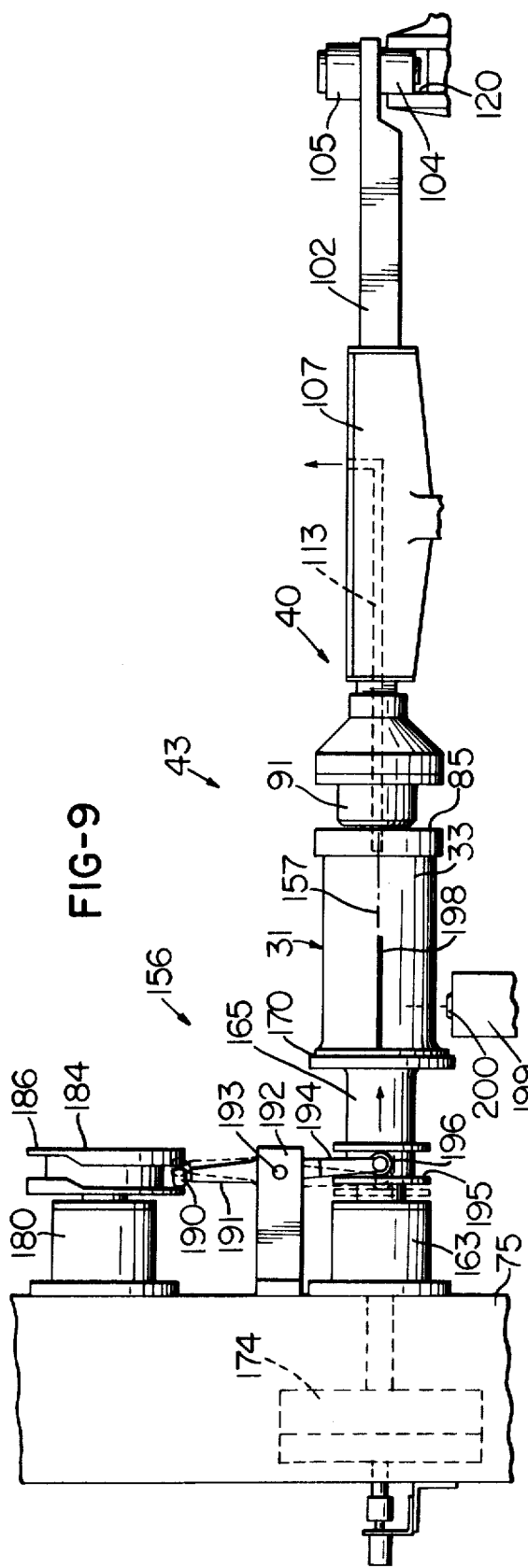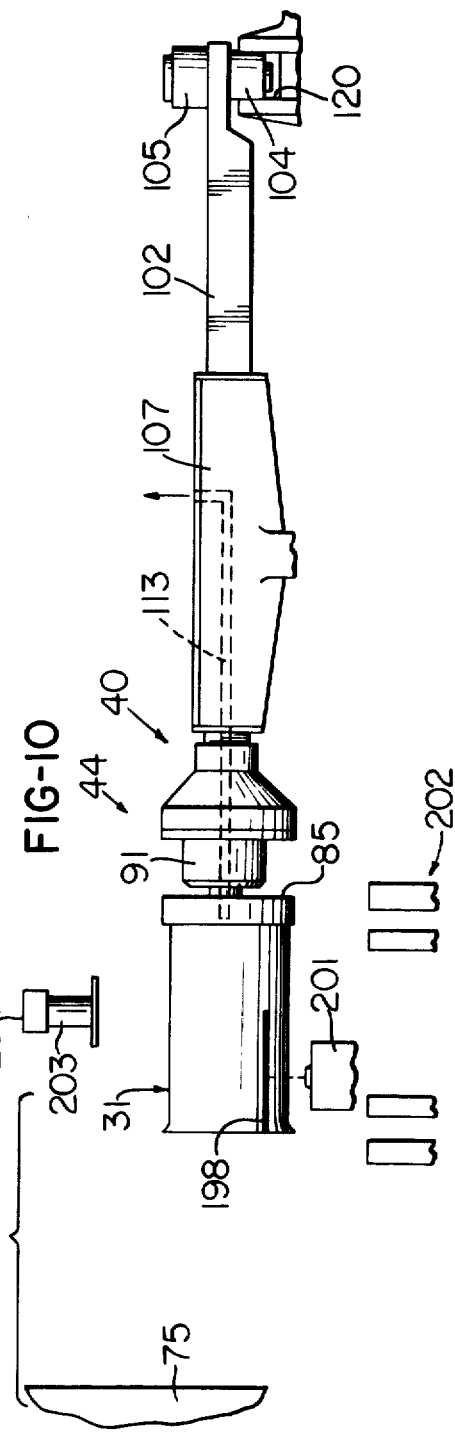

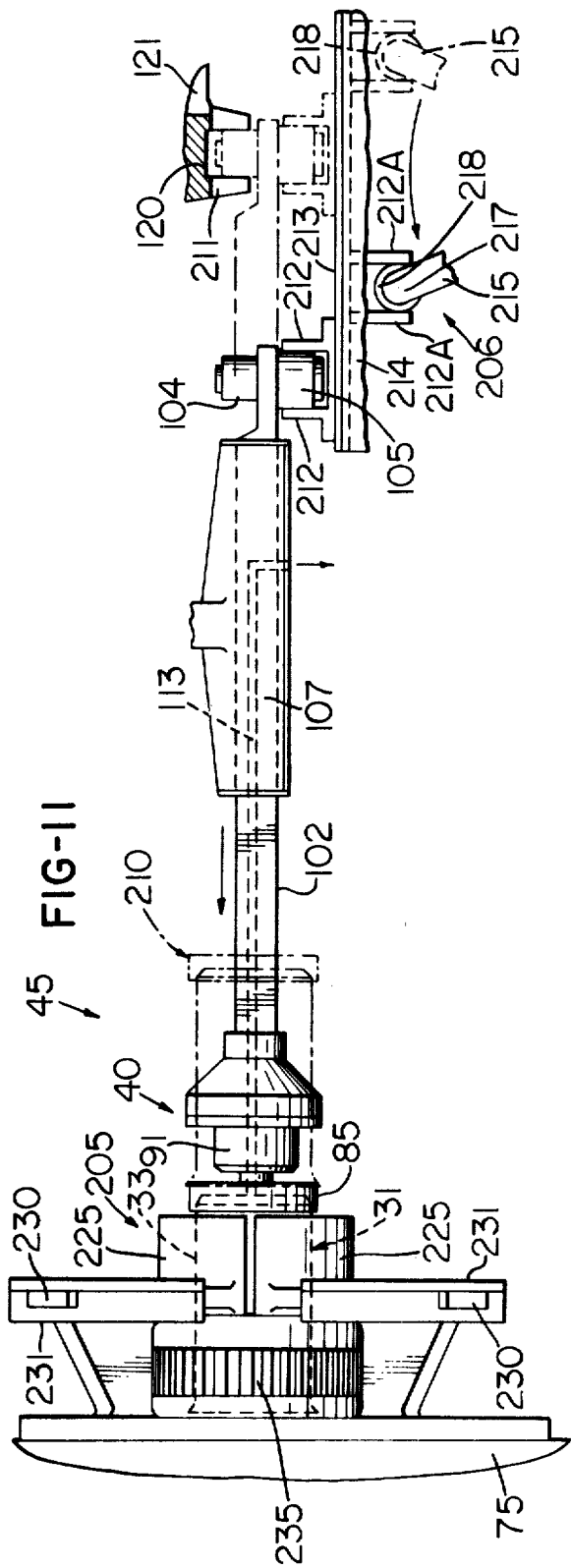
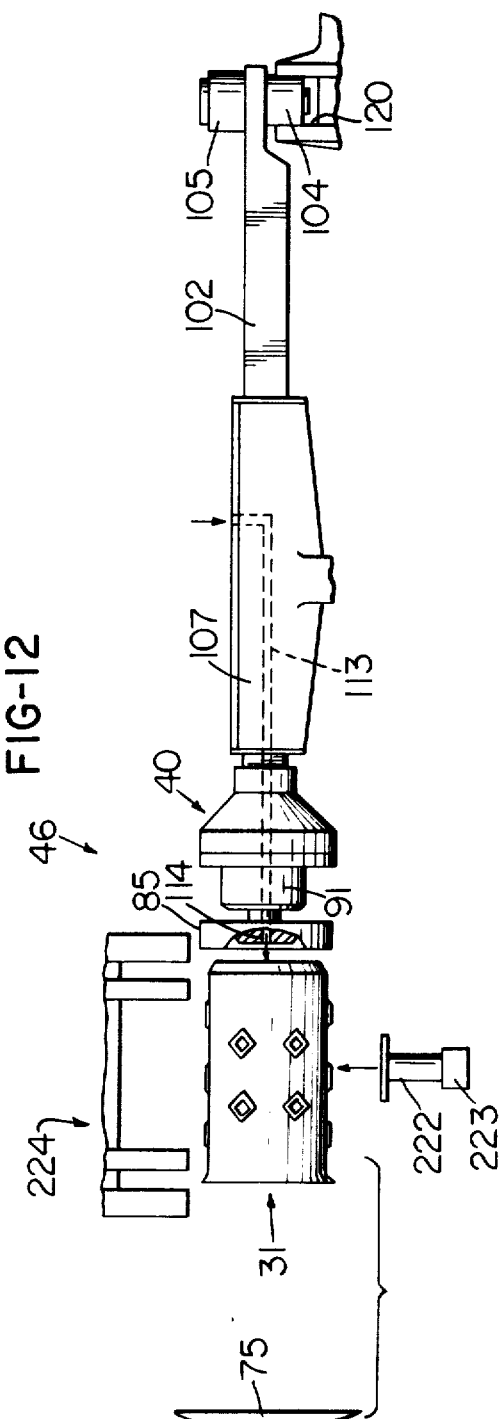

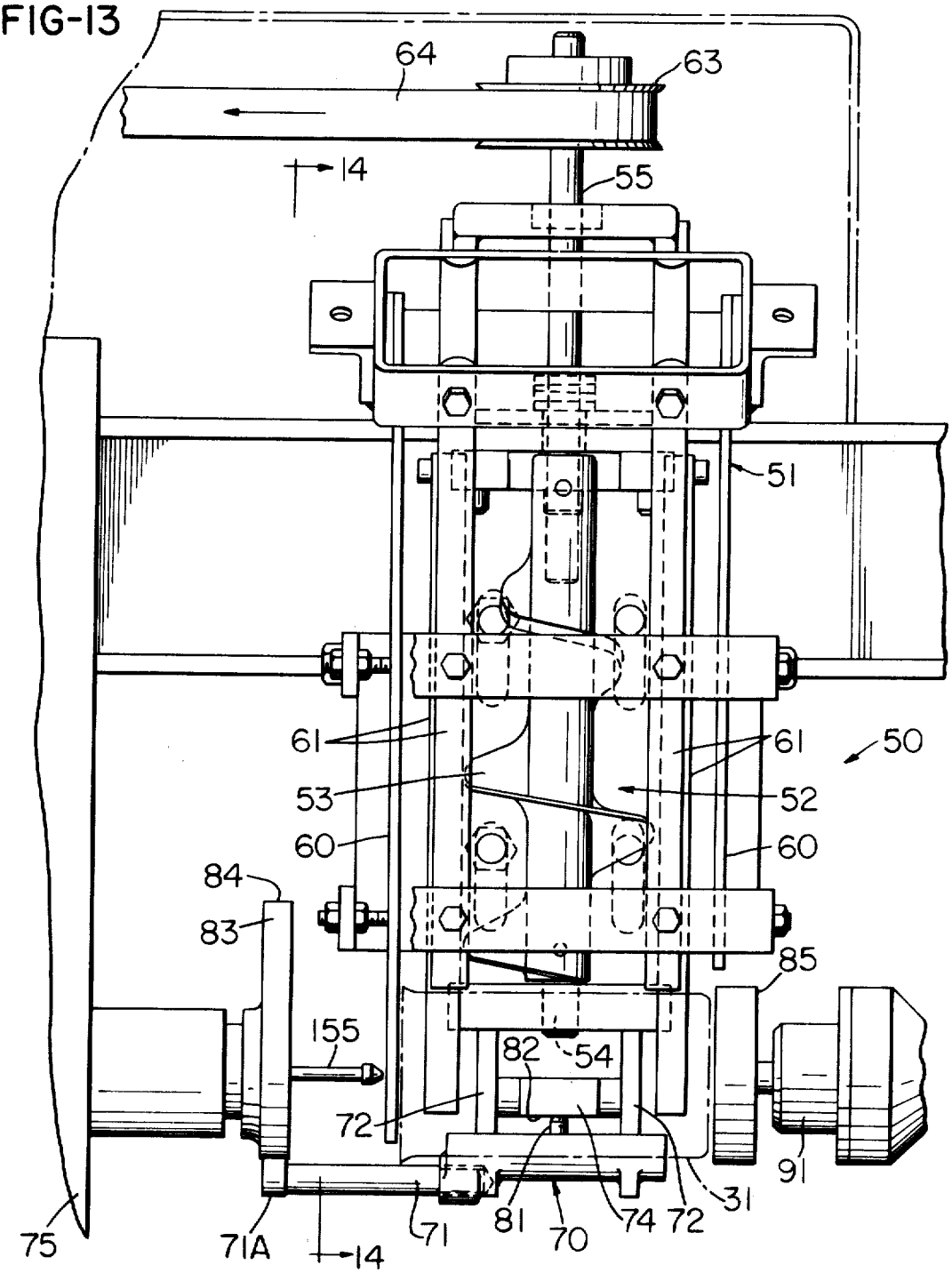

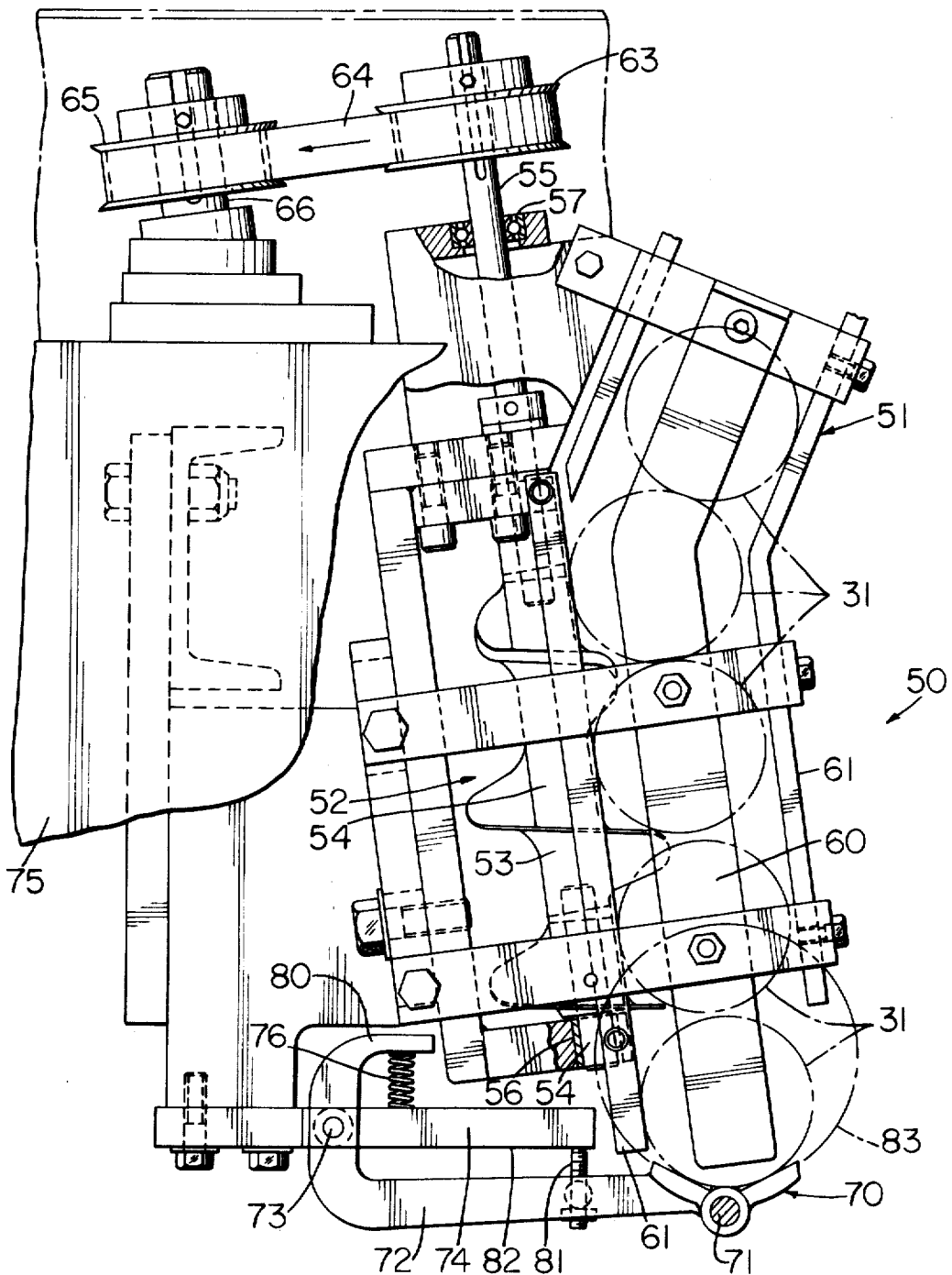

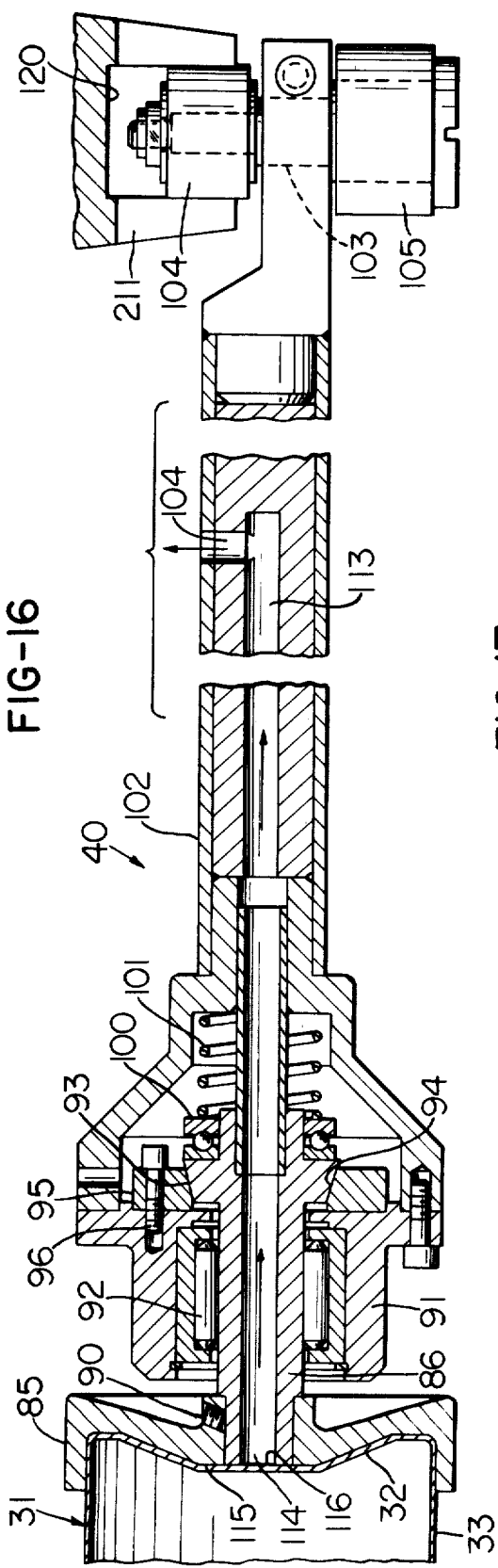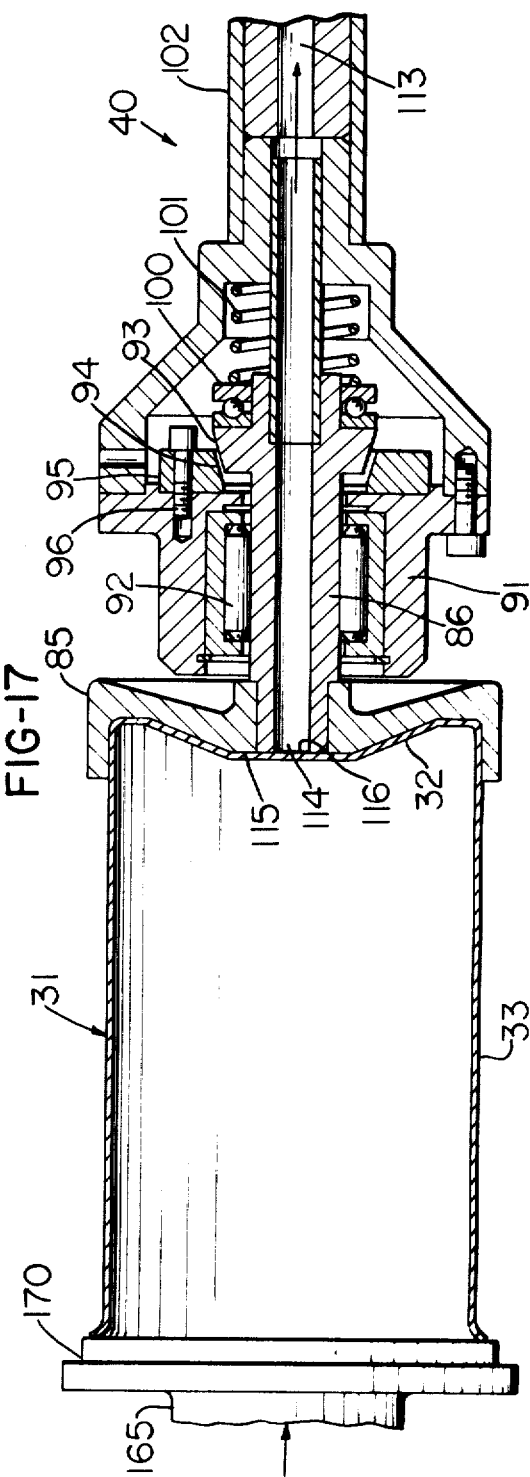
FIG-16
FIG-17

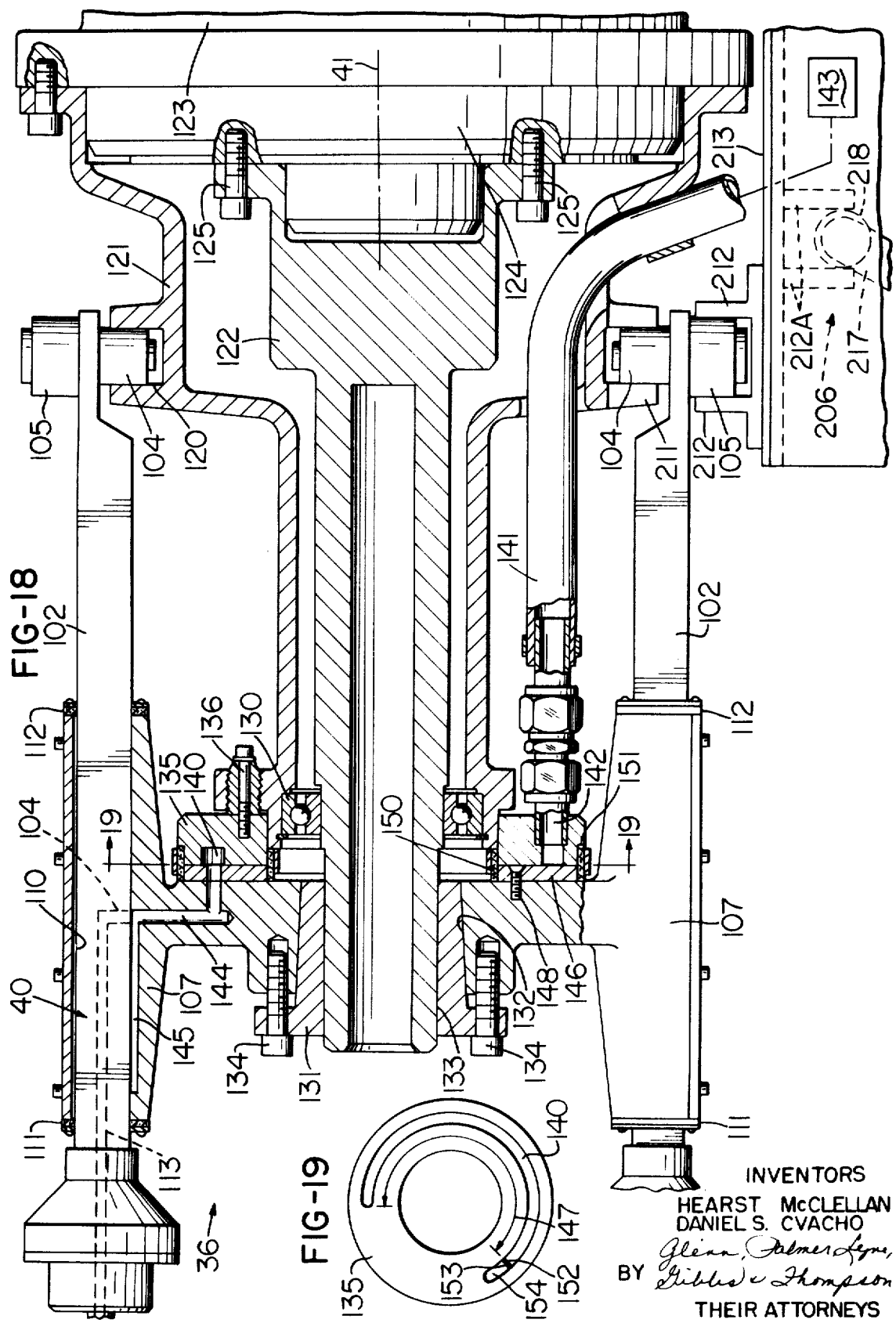

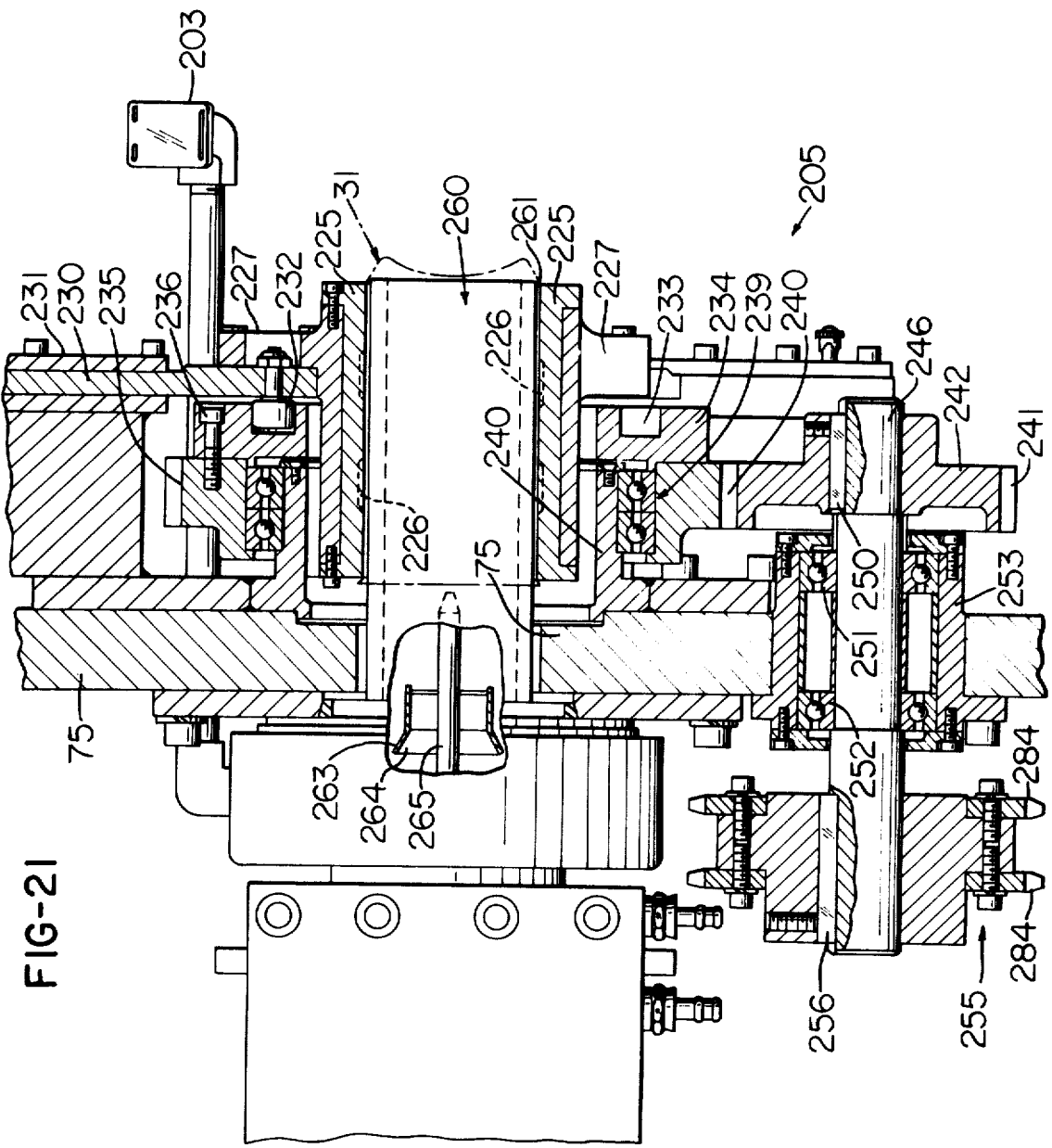

APPARATUS FOR AND METHOD OF SHAPING WORKPIECES

BACKGROUND OF THE INVENTION

Many products, such as beverages, for example, are sold in cans which have their exterior walls formed in various ways to enhance their appearance and thereby attract a potential purchaser. One technique which is used to form or shape cans is to emboss the sidewalls of such cans in various aesthetically appealing patterns which may comprise marks or outlines associated with a particular beverage and company. However, present apparatus and methods used to emboss cans are very slow or require very expensive equipment, which often makes the cost of embossing such cans prohibitive.

SUMMARY

This invention provides a high-speed and economical apparatus for and method of shaping, such as embossing, cylindrical workpieces wherein each workpiece is precisely serially fed to an infeed station where it is grasped and held while maintaining its sidewall completely accessible and then sequentially indexed to a plurality of stations including an embossing station for precision embossing of its cylindrical sidewall.

Other details, uses, and advantages of this invention will become apparent as the following description of the exemplary embodiment thereof presented in the accompanying drawings proceeds.

BRIEF DESCRIPTION OF THE DRAWINGS

The accompanying drawings show an exemplary embodiment of this invention, in which

FIG. 4 is a side view in elevation with parts in cross section and parts broken away of the apparatus illustrated in FIG. 1;

FIG. 5 is a view taken essentially on the line 5—5 of FIG. 4;

FIG. 6 is a view taken on the line 6—6 of FIG. 4;

FIG. 7 is a fragmentary view illustrating a particular can which has been serially fed onto a cradle at an infeed station to enable grasping and holding thereof by an associated orbiting assembly comprising the plurality of orbiting assemblies of the apparatus of FIG. 1 to enable indexing movement of the can to a plurality of stations arranged downstream thereof;

FIG. 8 is a view illustrating the manner in which the particular can is urged and supported against a support head comprising the associated orbiting assembly and illustrating the supporting cradle moved away from such can;

FIG. 9 is a view illustrating the particular can indexed to a rotary positioning station to enable precise rotary positioning thereof;

FIG. 10 is a view illustrating the particular can in position at an inspection station;

FIG. 11 is a view similar to FIG. 10 and illustrating the particular can, by dotted lines, indexed into position at a shaping station and also illustrating such can telescoped in position within a shaping device at the shaping station;

FIG. 12 is a view illustrating the completely embossed can indexed to the ejection station;

FIG. 13 is a fragmentary view illustrating the infeed conveyor of the apparatus of FIG. 1 and its associated structural portions;

FIG. 14 is a view taken on the line 14—14 of FIG. 13;

FIG. 16 is a fragmentary cross-sectional view particularly illustrating a rotatable support head comprising each support assembly with such support head and an associated can held in position in a nonrotatable position;

FIG. 17 is a fragmentary cross-sectional view illustrating the support head pushed inwardly to enable rotation thereof by the rotating device;

FIG. 18 is a fragmentary view with parts in cross section and parts broken away particularly illustrating the rotatable turret comprising the apparatus of FIG. 1 and the manner in which a plurality of head assemblies are supported on such turret;

FIG. 19 is a view taken essentially on the line 19—19 of FIG. 18;

FIG. 21 is a cross-sectional view taken on the line 21—21 of FIG. 20.

DESCRIPTION OF ILLUSTRATED EMBODIMENT

Figure 1:
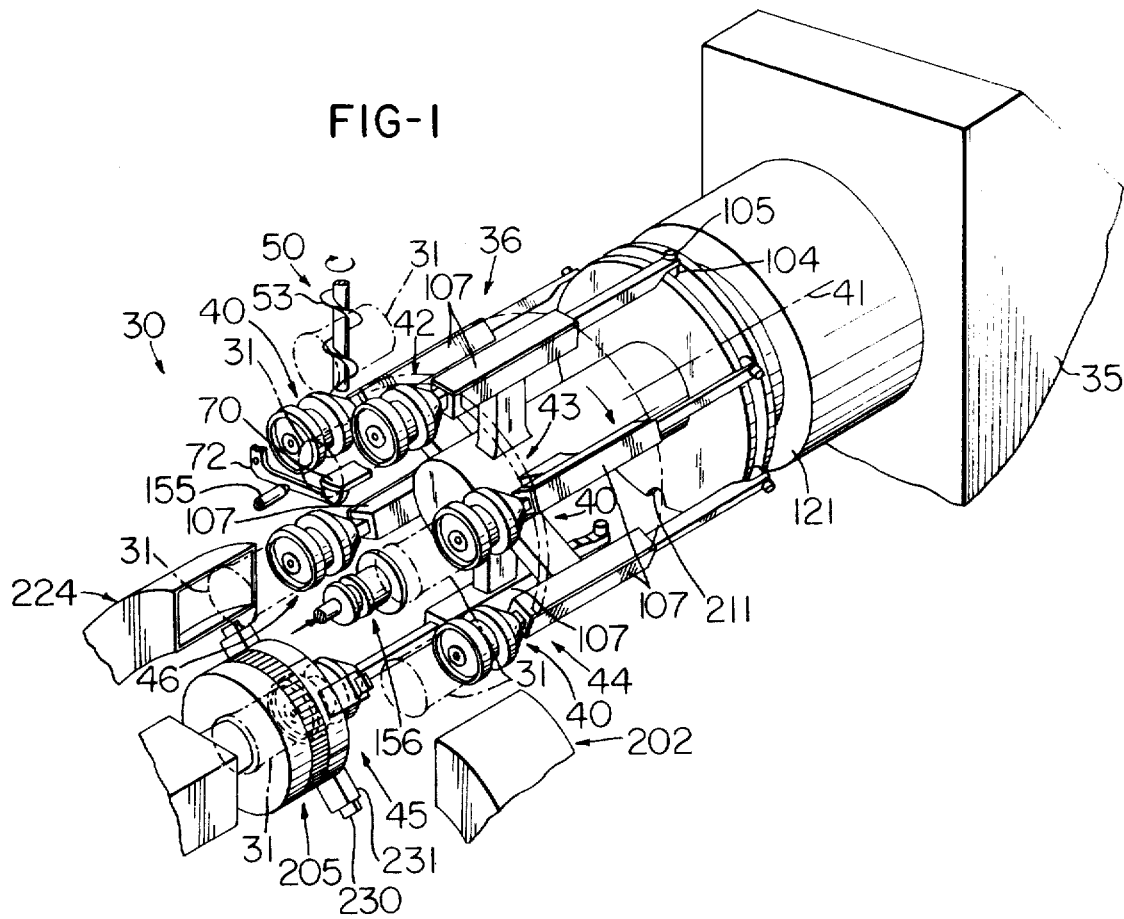
FIG. 1 is a perspective view with parts in cross section and parts broken away illustrating one exemplary embodiment of the apparatus and method of this invention which is particularly adapted to shape workpieces such as cans by embossing a predetermined pattern in the cylindrical sidewall of each such cans.
Figure 2:
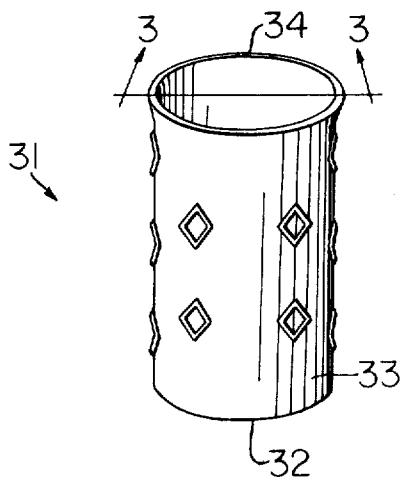
FIG. 2 is a perspective view of a can which has been embossed utilizing the apparatus and method of this invention.
Figure 3:
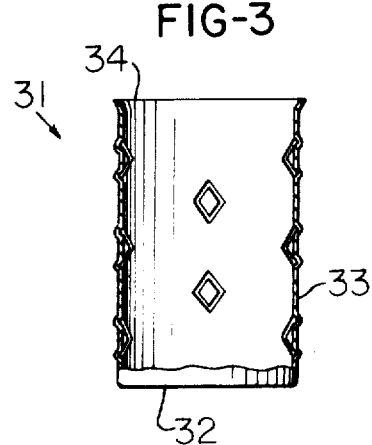
FIG. 3 is a fragmentary cross-sectional view taken on the line 3—3 of FIG. 2.

Reference is now made to FIG. 1 of the drawings wherein one exemplary embodiment of the apparatus and method of this invention is illustrated and designated generally by the reference numeral 30. The apparatus and method of this invention is particularly adapted to shape, i.e., emboss in this example, workpieces such as tubular cans 31 in mass production quantities generally of the order of 200 cans per minute.

Each exemplary can 31 processed by the apparatus or machine 30 has a bottom wall 32 which is adjoined by a cylindrical sidewall 33 which terminates in an outer edge 34 and the apparatus and method of this invention enables embossing of the sidewall 33 of each can while holding the can in a cantilevered manner to provide easy access to such sidewall. Any desired pattern may be embossed on the sidewall 33 to provide optimum aesthetic appeal for the particular can and thereby attract attention thereto and to the product contained within the can and the embossed pattern provided on each can 31 may include marks or outlines associated with a particular product or company. For ease of presentation, the sidewall 33 of the exemplary can 31 is shown as having a diamond-shaped pattern embossed thereon.

The machine 30 comprises a supporting frame 35 which rotatably supports a turret 36 and the turret supports a plurality of six head assemblies, each designated by the reference numeral 40, for orbiting movement about a central horizontal axis 41. Each head assembly 40 has means for holding an associated can 31 thereon to enable each can to be grasped and held in a cantilevered manner with its open end arranged outwardly. Each head assembly 40 grasps an associated can as it is fed into the machine 30 at an infeed station 42 and holds each can so as to enable the turret 36 to orbit the head assembly 40 and its can 31 first to a rotary positioning station 43 to enable precise rotary positioning thereof, then to an inspection station 44 to ascertain whether the particular can has been positioned in the required manner, then to a shaping station 45 to enable shaping, i.e., embossing, of its sidewall 33 and then to an ejection station 46 where the embossed can is discharged from the machine 30.

As seen particularly in FIGS. 1, 13, and 14 the machine 30 has an infeed 50 for serially feeding the cans 31 into the machine and the infeed 50 comprises an inlet chute 51 which conveys cans by gravity from a suitable source and a screw conveyor assembly 52 which moves the cans 31 in a precise and positive manner to the machine 30. The conveyor assembly 52 comprises a screw conveyor 53 which has shaft portions 54 and 55 extending from its opposite ends and such shaft portions are suitably supported for substantially frictionless rotation in bearings 56 and 57 respectively carried by associated structural portions of the conveyor assembly 52. The conveyor assembly 52 also has opposed guides 60 which are adapted to engage opposite ends of each can 31 and opposed guides 61 which are adapted to engage the sidewalls 33 of the cans 30 as they are positively moved into the machine 30 by the screw conveyor 53. The guides 60 and 61 may be made of any suitable antifriction material, such as Teflon, for example, to prevent marring or scratching of the cans 31 as they are fed into the machine 30.

The screw conveyor 53 has a pulley 63 keyed to the top end portion of the shaft 55 and the pulley 63 is driven by a belt 64 which is in turn driven by a driving pulley 65 which is suitably keyed to a driving shaft 66. The shaft 66 is operatively connected in a synchronized manner with the turret 36, as will be described subsequently, and the screw conveyor 53 serially feeds each can 31 into the machine 30 in a precise and positive manner as an associated head assembly 40 moves into position opposite the infeed station 42.

Each can 31 is deposited by the screw conveyor 53 on a cradle 70 and the cradle 70 is fixed to a cam rod 71 carried at the terminal end of a roughly C-shaped arm 72. The arm 72 has its bight portion pivotally supported on a plate 74 by a pivot pin 73 and the plate 74 is fixed to an upstanding structural portion 75 comprising the machine frame 35. A compression spring 76 is also provided and acts between the top surface of the plate 74 and the upper leg portion 80 of the arm 72 to resiliently hold the cradle 70 so that it may be precisely positioned. The roughly C-shaped arm 72 has a threaded stop screw 81 which is threaded therethrough and abuts a lower surface 82 of the plate 74 and the spring 76 yieldingly urges the arm 72 and hence the cradle 70 in a clockwise direction about the pivot pin 73, as viewed in FIG. 6.

The infeed 50 comprises an eccentric cam 83 having an outer cam surface 84 which is adapted to engage a freely rotatable cam roller 71A on the cam rod 71 to thereby position the rod and cradle 70 in a precisely controlled manner. The rotation of the cam 83 is synchronized with the rotation of the turret 36 and of the screw conveyor 53 and the cam 83 operates to continuously override the compression spring 76 to provide positive positioning of the cradle 70.

Each head assembly 40 comprises a rotatable support head 85 which is fixed to the terminal outer end of an axially movable shaft 86 by a setscrew 90, see FIGS. 16 and 17. The shaft 86 is supported by an antifriction bearing assembly 92 in a structural housing portion 91 to enable frictionless rotation under certain conditions and as will be described subsequently.

The shaft 86 has a forwardly tapered frustoconical bearing surface 93 which is normally held yieldingly urged against a cooperating frustoconical surface 94 which comprises an annular plate 95 which is fixed to the housing 91 by bolts 96. The shaft 86 also has an axial thrust bearing 100 operatively associating with its inner end and a compression spring 101 acts between the housing 21 and the bearing 100 to enable frictionless rotation of the shaft 86 and hence the support head 85 once the bearing surface 93 is moved away from the cooperating surface 94. The structural housing 91 is suitably fixed to the terminal outer end of an arm 102 and the inner end of the arm 102 has a shaft 103 fixed thereto which rotatably supports a roller 104 at one end thereof and another roller 105 at its opposite end for substantially frictionless rotation about the shaft 103.

The turret 36 is in the form of a spider having a plurality of six radially extending supporting arms or supports 107 and each support is adapted to receive an associated arm 102 through an opening 110 extending therethrough while allowing axial telescoping movement of arm 102 through opening 110 in a manner to be subsequently described, see FIG. 18. The support 107 has a pair of seals 111 and 112 suitably fixed at opposite ends thereof and the seals 111 and 112 provide a fluidtight seal between the arm 102 and the support 107.

As seen in FIGS. 16–18, each arm 102 has a fluid passage 113 extending therethrough which exits the arm through an opening 104 which is always maintained within the confines of the seals 111 and 112. The support head 85 also has a passage 114 extending therethrough and the passage 114 communicates with passage 113 at its inner end and exits a contoured surface 115 which defines the outer surface of a support head 85 at its outer end through an opening 116 which is arranged substantially centrally within the contoured surface 115. The passage 114 is operatively connected to a fluid system (by means of passage 113) which operates to hold each can 31 by vacuum against the support head 85 during most of the operating cycle on each can.

The contoured surface 115 may have a configuration which corresponds to the contoured configuration of the bottom wall 32 of each can 31 and as each head assembly 40 is indexed in position at the infeed station 42 vacuum is applied through the passages 114 and 113, causing the associated can 31 to be urged against the support head 85 and held thereagainst in a cantilevered manner. Each head assembly 40 and its can 31 is then rapidly indexed by the turret 36 to the various processing stations arranged downstream of the infeed station 42 enabling each can to be processed through the machine 30 in a rapid and efficient manner.

Each arm 102 comprising the rear portion of each assembly 40 has a substantially rectangular peripheral outline and the opening 110 through each support 107 also has a corresponding rectangular peripheral outline. The cam roller 104 carried at the rear portion of each arm 102 is received within a cooperating annular cam groove 120 provided in a structural housing 121 (see FIG. 18) for the drive shaft 122 which rotates the turret 36. The shaft 122 is fixed to a rotatable assembly 124 by a plurality of bolts 125 and the assembly 124 is operatively connected to and driven by a gearbox assembly 123. The shaft 122 has an antifriction ball bearing 130 fastened in position adjacent its terminal outer end and the bearing 130 enables the shaft 122 to be rotated in an antifriction manner with respect to the fixed housing 121.

The turret 36 is fixed to shaft 122 by an annular wedging member 131 which is wedged between an inside surface 132 of the turret 36 and a reduced diameter outside surface 133 at the outer end of the shaft 122 and member 131 is held in its wedged position by a plurality of bolts 134 which act between such member and the end of the turret 36. Upon rotating the drive shaft 122 the turret 36 rotates simultaneously therewith whereby such turret may be rotated in an indexing manner to enable each can 31 to be indexed into the various stations of the machine 30.

During orbiting and indexing movement of the head assemblies 40 the support heads 85 are held so that they move in a substantially fixed vertical plane. This is achieved by the cam rollers 104 being axially confined within the cam groove 120 provided on the housing 121. At the embossing station 45 each head assembly together with its can 31 is moved or telescoped outwardly causing the can 31 to be brought into position for embossing by an associated embossing device and in a manner to be described in detail subsequently.

The machine 30 has an annular plate 135 fixed to the structural housing 121 by a plurality of bolts 136, see FIGS. 18 and 19, and the plate 135 has a contoured vacuum groove 140 provided therein. The vacuum groove 140 is connected in fluid flow communication with one end of a vacuum line 141 which is fixed to the plate 135 in a fluidtight manner as shown at 142 and the line 141 has its opposite end connected to a suitable vacuum source 143 which is indicated schematically in FIG. 18.

The turret 36 has a plurality of internal passages 144 each having a portion thereof extending through an associated support 107 and the outer end of each passage 144 terminates in an elongated slot 145 over which the outlet opening 104 in an associated arm 102 is adapted to register. The slot 145 assures that a vacuum is always provided to an associated head assembly 40 and its can 31 over the full angular distance, indicated at 147, of the slot 140 and at the embossing station 45 where the arm 102 is telescoped outwardly.

The machine 30 also has an annular plate 146 fixed to the rotatable turret 36 by screws 148 and plate 146 is arranged between the plate 135 and the turret whereby the plate 146 rotates with the turret 36. A pair of seals 150 and 151 are provided and suitably held in position to assure that there will be no leakage between the fixed plate 135 and the rotating plate 146 and hence rotating turret 36.

Once a particular can 31 has been received at the infeed station 42 the can is held by a vacuum during orbiting movement of turret 36 through stations 43, 44, 45 and to a point 152, see FIG. 19, immediately upstream of station 46. Vacuum is released at point 152 because the vacuum groove 140 terminates in a thin wall 153, one surface of which defines point 152. The opposite surface of wall 153 defines an end surface of an arcuate pressure groove 154 in plate 135 and the groove 154 is connected by a line similar to line 141 to a source of air under pressure, not shown. Once an embossed can 31 is indexed to ejection station 46, air is supplied through pressure groove 154 to break any vacuum that may be acting on the bottom wall 32 of the can and enable the can to be easily ejected in an associated chute for acceptable cans.

To assure that each can 31 is urged with its bottom wall 32 against a support head 85 at the infeed station 42, an air nozzle 155 is provided at the infeed station, see FIGS. 7 and 8, and the nozzle 155 cooperates with the vacuum applied through the passage 114 of the support head 85 to assure that a can 31 is moved against support head 85 and then held thereagainst by the vacuum applied through the passage 114. The pressure nozzle 155 is supplied with air from any suitable source and may be suitably operated in timed sequence so as to eject air against the inside surface of the bottom wall 32 of an associated can as the can is positioned on the cradle 70.

Substantially simultaneously with the urging and holding of a particular can 31 against the support head 85, the cradle 70 is moved out of position so that it will not interfere with the orbiting movement of the can 31. This is achieved by the cam 83 engaging the cam roller 71A supported on the cam rod 71 and moving the rod and cradle away and as previously mentioned the operation of the cam 83 is in timed sequence with the orbiting indexing movement of the turret 36.

Figure 15:
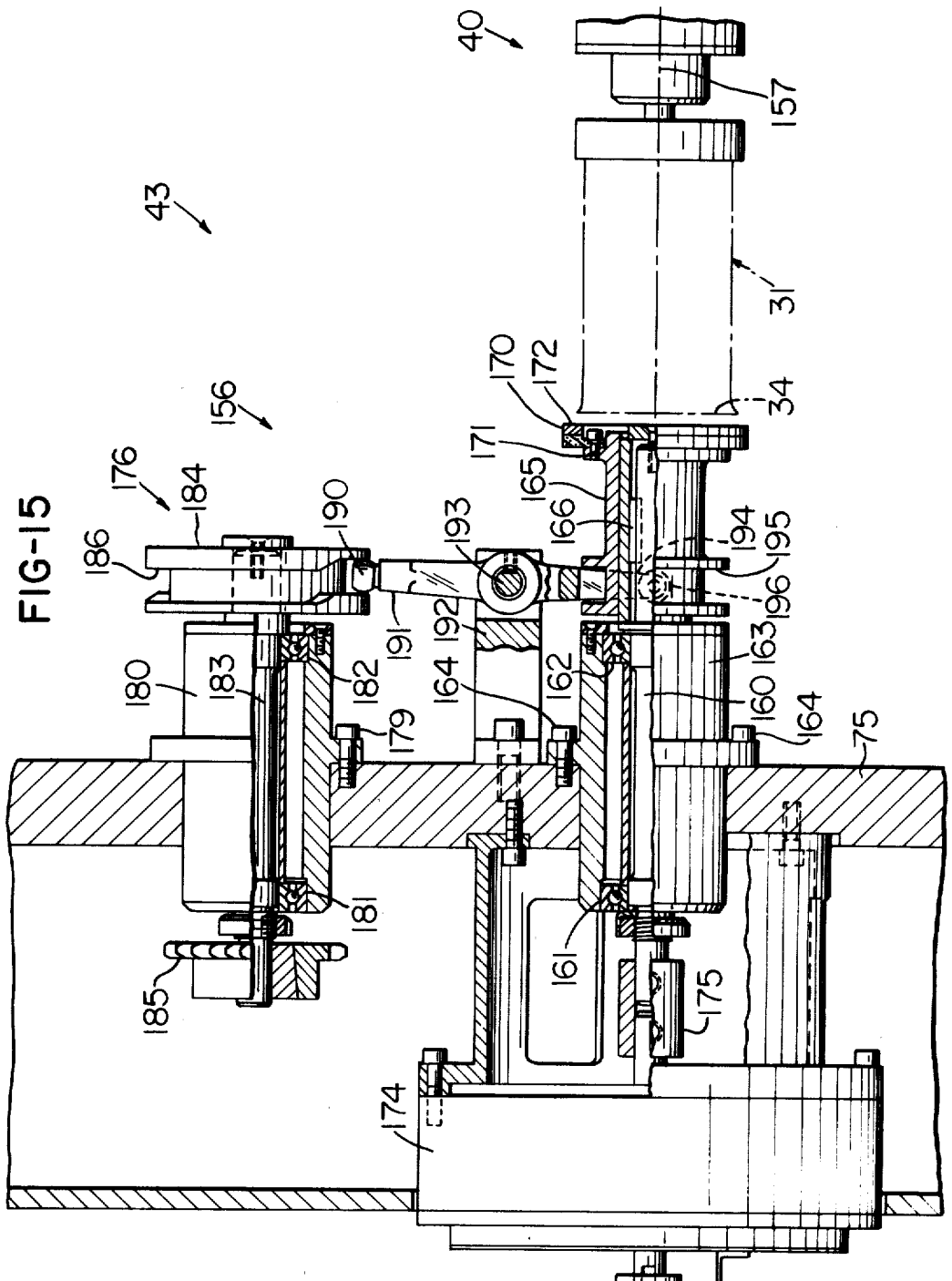
FIG. 15 is a fragmentary view with parts in cross section particularly illustrating a device for rotating the can at the rotary positioning station of the apparatus of FIG. 1.

Each can 31 is then indexed to the rotary positioning station 43, see FIGS. 6 and 9, and at the rotary positioning station a rotating device 156 is utilized to rotate the can 31 and position the can about an axis 157 extending through the head assembly 40 and hence through the can so that once the can 31 is indexed to the embossing station 45 the embossing will be provided thereon at the desired location. As seen in FIG. 15, the rotating device 156 comprises a rotatable shaft 160 which is supported by a pair of ball bearings 161 and 162 carried by a substantially tubular structure 163 which is fixed to structural portion 75 by a plurality of threaded bolts 164. The shaft 160 supports a roughly cylindrical housing 165 at its terminal outer end for axial telescoping movement and the housing 165 is keyed to the shaft 160 by a key 166 to prevent relative rotation therebetween.

The cylindrical housing 165 has an annular member which will be referred to as a clutch plate 170 at its terminal outer end and the plate 170 is fixed to the housing 165 by a plurality of threaded bolts 171 and the plate 170 has an annular friction surface 172. Thus, the housing 165 is rotatable with the shaft 160 and is axially slidable with respect thereto for reasons which will be apparent later in this specification. The rear portion of the shaft 160 is operatively connected to a motor and brake assembly 174 through a mechanical coupling arrangement illustrated at 175. The assembly 174 is adapted to rotate the shaft 160 and hence housing 165 with its plate 170.

The rotating device 156 also has a unit 176 which is utilized to control the axial position of the plate 170. The control unit 176 comprises a support housing 180 which has a pair of antifriction bearings 181 and 182 oppositely arranged therein and the bearings support a shaft 183 for substantially frictionless rotation. The housing 180 is fixed to structural portion 75 by a plurality of bolts 179.

The unit 176 has a cam 184 suitably fixed to its terminal outer end and a drive shown as a toothed pulley 185 fixed to the rear end of the shaft 183 to drive such shaft and the cam 184 in a synchronized manner with the remainder of the machine 30. The cam 184 has a groove 186 extending circumferentially therearound which is adapted to receive one end 190 of a pivoted arm 191 comprising the rotating device 156.

The arm 191 is supported on the structural portion 75 by a bracket 192 and is pivoted about a pivot pin 193 carried by the bracket 192. The arm 191 has a lower end 194 provided with a cam roller 196 which is received within an annular groove 195 comprising the rear portion of the housing 165. The cam roller 196 enables frictionless rotation of the housing 165 while the axial position thereof is being controlled by arm 191.

The operation of the rotating device 156 is of utmost simplicity and efficiency as will now be explained in connection with FIGS. 15–17. As each can 31 is indexed into the rotary positioning station 43 it will be arranged opposite the rotating plate 170. The configuration of the cam is such that it will pivot arm 191 about its pivot pin 193 to thereby urge the cylindrical housing 165 and hence the plate 170 against the terminal outer edge 34 of the particular can 31 indexed into the rotary positioning station 43. As the clutch plate 170 is urged against edge 34 it overrides the compression spring 101 provided in the associated head assembly 40 thereby moving the bearing surfaces 93 and 94 apart and allowing the can 31 and its support head 85 to be rotated by the rotating device 156.

The machine 30 has a detector associating therewith which detects a registration mark 198 provided on the sidewall 33 of the particular can 31 being positioned to enable stopping rotation of the can 31 at the desired position. The detector in this example comprises a photoelectric detector 199 which operatively associates with the control for the motor and brake assembly 174 to energize such assembly and instantaneously stop rotation thereof once the photoelectric detector 199 has detected the mark 198.

The operation of the photoelectric detector 199 is such that it will only be energized once an associated can 31 being positioned has reached a predetermined speed whereupon once the mark 198 moves past the eye 200 of the detector 199 an appropriate electrical signal is supplied to the motor and brake assembly 174 to substantially instantaneously stop such assembly. This technique of bringing the can 31 up to a predetermined speed assures that once the motor and brake assembly 174 receives a signal from the detector 199 the can will be stopped at the desired rotary position to enable precise and subsequent embossing thereof. Once the particular can 31 has been rotary positioned at the positioning station 43 the can 31 is then indexed to the inspection station 44 by the turret 36.

Following rotary positioning of the particular can 31 the operation of the cam 184 is such that the housing 165 is telescoped rearwardly moving the plate 170 away from the can 31 whereby the compression spring 101 provided in the head assembly 40 urges the surfaces 93 and 94 together and holds the support head 85 and the now positioned can 31 in the desired position so that such can may be indexed to the inspection station 44, see FIGS. 6 and 10.

At the inspection station 44 another detector shown as a second photoelectric detector 201 determines if the registration mark 198 is at the proper position. If the mark 198 is at the required position the particular can will then be indexed to embossing station 45; however, should the mark be positioned so that it cannot be detected by photoelectric detector 201 the detector is operatively connected to an associated rejection device to eject the can from the inspection station 44 into a reject chute 202 whereupon such can would be subsequently reintroduced into the machine 30 for embossing.

The rejection device in this example of the invention is shown as an air pressure nozzle 203 which is supplied with air under high pressure from a suitable source through an associated line and shutoff valve 204 arranged immediately upstream of the nozzle 203. In the event the registration mark 198 is not in the desired position the valve 204 is opened by a signal from the detector 201 whereupon the can 31 is blown from its support head 85 into chute 202.

In this example of the invention vacuum is still being supplied through the support head 85 to hold the can 31 against such support head and the energy of the air jet from the blowoff nozzle 203 is sufficient to blow the improperly positioned can 31 into chute 202. It will also be appreciated that it may be desired in some applications of this invention to provide a mechanical stripping arm or other suitable stripping mechanism to remove any can which has been improperly rotatably positioned.

The properly positioned can is then indexed to the shaping or embossing station 45 and, for this discussion, particular reference is made to FIGS. 6 and 11 of the drawings.

The embossing device comprising the machine 30 is designated generally by the reference numeral 205 and once a can 31 is indexed to the embossing station 45 the associated head assembly 40 is moved by an associated moving means or actuating device 206 so that the can 31 is brought into operative association with the embossing device 205 to enable embossing thereof. In particular, the head assembly 40 is moved by the actuating device 206 from the dotted line position illustrated at 210, FIG. 11, to the solid line position illustrated in such figure whereby the sidewall 33 of the particular can 31 is positioned so that it may be embossed in the desired manner.

As previously indicated, each head assembly 40 has an arm 102 of rectangular outline extending rearwardly therefrom and the arm has cam rollers 104 and 105 fixed thereto. The roller 104 is normally carried within the annular groove 120 provided in the structural housing 121 and during orbiting-indexing movement of the head assembly 40 each roller 104 assures that its can is moved in a vertical plane. Once the can to be embossed is indexed to the embossing station 45 it will be seen that the roller 104 is aligned within a cutout 211 in housing 121 so that the roller 104 and arm 102 may be telescoped outwardly toward the embossing device 205.

As the roller 104 is indexed in aligned relation with the cutout 211 the roller 105 is simultaneously aligned in position between upstanding flanges 212 of a slide 213 which is supported for rectilinear movement on a slide support 214 carried by the frame 35 of machine 30 and the slide 213 also has downwardly extending flanges 212A. The slide 213 with its flanges 212 and 212A comprise a portion of the actuating device 206 which is utilized to telescope the head assembly 40 and its can 31 into embossing position and the device 206 also comprises an actuating arm 215 which is driven by a drive assembly 216. The arm 215 has a swinging end 217 provided with a rotatable roller 218 which is received between the flanges 212A and the arm 215 is used to reciprocate the slide 213 toward and away from the embossing device 205.

Thus, each can 31 is easily telescoped into the embossing device 205 by the arm 215 moving slide 213 and hence the associated head assembly 40 and can carried thereby outwardly. The can 31 is held in position in the embossing device a predetermined time interval as determined by the synchronized machine components whereupon the arm 215 is automatically retracted and the embossed can 31 is indexed to the ejection station 46.

In this example of the invention the moving means is shown in the form of a pivoted arm 215 which has the roller 218 carried on its outer swinging end 217 which engages downwardly extending flanges 212A to move the slide 213. However, it will be appreciated that any suitable actuator may be provided to move each head assembly 40 and its can 31 toward and away from the embossing device 205 at the embossing station 45.

As previously mentioned, once a particular can 31 has been embossed it is then indexed to the ejection station 46 where it is removed from the machine 30. At the ejection station the passage 114 normally supplying a vacuum to the bottom wall of a particular can 31 is in flow communication with the pressure groove 154, as previously mentioned, whereby the vacuum holding the can 31 on its support head 85 is effectively broken.

The machine 30 has a can ejection device at station 46 which is comprised of an air nozzle 222 connected to a source of air under high pressure with airflow through the nozzle being controlled by a shutoff valve 223 arranged upstream thereof. Once an embossed can moves into position at station 46 the valve 223 is opened and a jet of air propels the can into a discharge chute 224, see FIGS. 6 and 12.

Figure 20:
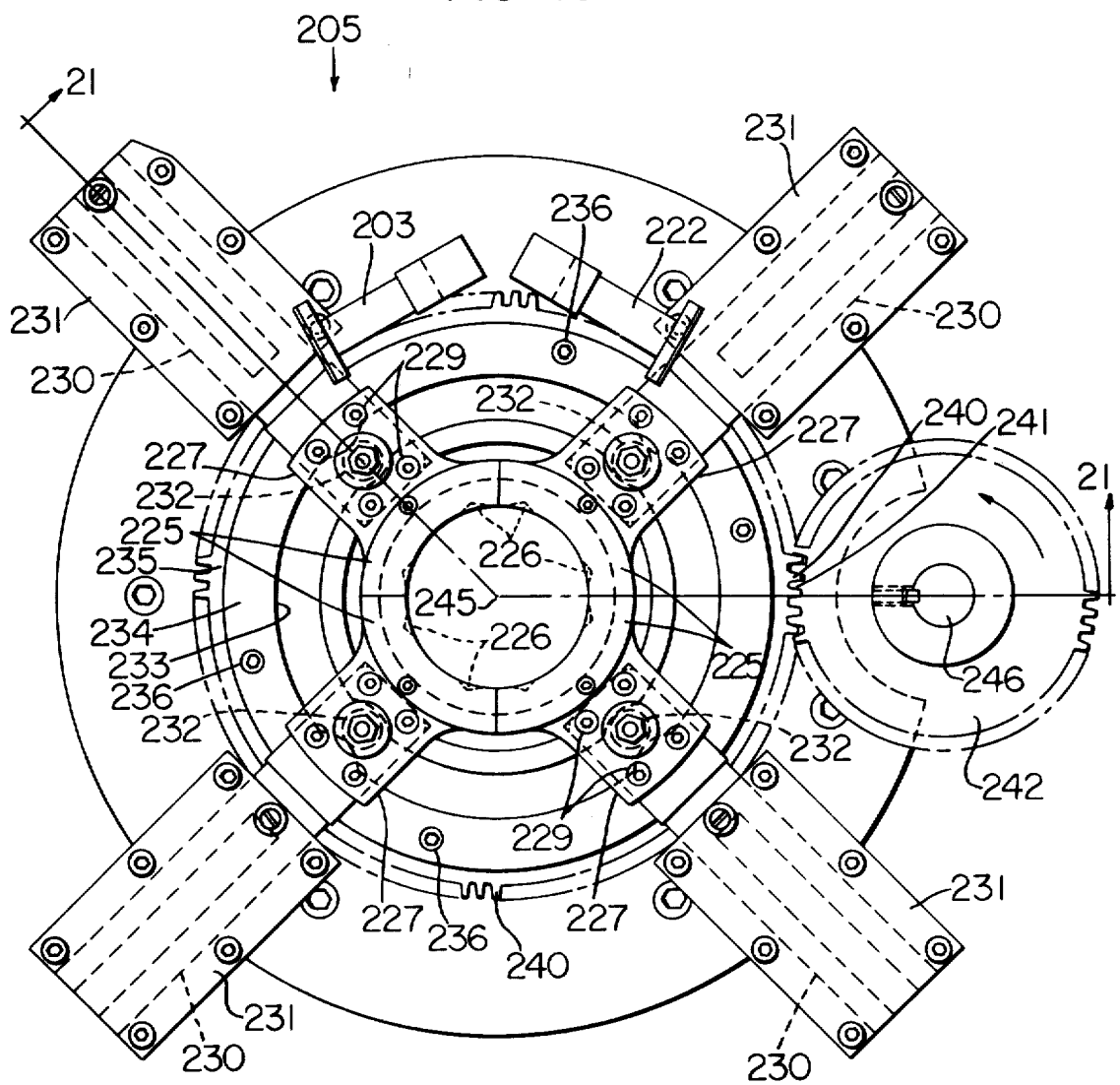
FIG. 20 is a view taken on the line 20—20 of FIG. 4.

The embossing device 205 may be of any suitable construction and in this example of the invention comprises a female die assembly comprised of a plurality of cooperating segments each designated by the reference numeral 225, see FIGS. 20 and 21. Each cylindrical segment 225 may have integral recesses 226, or similar means, provided therein which define the embossing pattern which is to be provided in the sidewall 33 of each can 31. Each die segment 225 has a flange portion 227 fixed thereto and a slide 230 is fixed to the flange portion 227 by threaded bolts 229. The die assembly also has a plurality of slide tracks 231 each adapted to support an associated slide 230 for radial movement toward and away from an associated can 31 with the can in its embossing position and each flange portion 227 also has a cam roller 232 suitably rotatably supported thereon.

The die segments 225 are moved by the cam rollers 232 and the movement of the cam rollers is controlled by cam surfaces defining a cam groove 233 provided in a cooperating rotatable annular plate 234. The plate 234 is rotated as will now be explained and during rotation thereof the rollers 232 move within the cam groove 233 causing the segments to move radially inwardly and outwardly while being guided by movements of the slide 230 in their associated slide tracks 231 which are fixed to the structural portion of the machine 30.

The plate 234 is fixed to a ring gear 235 by a plurality of threaded bolts 236 and the ring gear 235 is rotatably supported by a ball bearing assembly 239 which is in turn supported on a cylindrical flange 240 which is fixed to the structural portion 75. The gear 235 has a plurality of gear teeth 240 which are adapted to be engaged by cooperating teeth 241 of a driving gear 242. Thus, upon rotating the gear 242 the gear 235 and plate 234 are simultaneously rotated about a central axis 245 through the embossing device 205.

The driving gear 242 is driven by a shaft 246 which is suitably keyed thereto by a key 250 and the shaft is rotatably supported by a pair of spaced ball bearings 251 and 252 which are in turn carried in a cylindrical housing 253 which is suitably fixed to the support structure 75. A sprocket assembly 255 is fixed to the outer end of the shaft 246 and keyed thereto by a key 256 and the sprocket assembly 255 is driven in a synchronized manner with the other components of the machine so that once a can 31 is indexed opposite the embossing station the gear 240 rotates the ring gear 235 and cam plate 234 so that the cylindrical die segments 225 are moved radially outwardly allowing the can 31 to be received therewithin. With the can in position continued rotation of the cam plate 234 causes the die segments to be positioned snugly around the outer periphery of the cylindrical sidewall 33 whereupon the embossing action may then take place and once such embossing action has been completed the segments 225 are expanded radially outwardly allowing the now embossed can to be removed.

The embossing device 205 comprises means adapted to forcefully urge the sidewall 33 of each can 31 against the integral recesses 226 provided in each cylindrical segment 225. Any suitable means may be utilized to achieve the outward urging of the sidewall 33; however, in this example of the invention an electrical coil device 260 is provided and is arranged so that the outer periphery thereof is arranged closely adjacent the inside surface of the cylindrical sidewall 33 as indicated at 261. The coil 260 comprises a part of a device sold under the trade name of Magnaform by Gulf General Atomic Incorporated of San Diego, California. Basically, the coil 260 operates to instantaneously release a burst of energy which acts as a mechanical force against the inside surface the sidewall 33 of a can 31 and causes such sidewall to be forcefully urged against the recesses 226 provided in each cylindrical segment 225 to thereby emboss the sidewall as determined by the recesses.

The embossing device 205 also has a funnel 263 suitably supported rearwardly of the coil 260 and the funnel 263 is adapted to discharge air contained within a can to be embossed through an annular passage portion 264 as the can is telescoped over the coil 260. The funnel 263 also has an air jet 265 which associates therewith and the air jet 265 is used to forcefully eject air against the bottom wall of each embossed can 31 once the cylindrical die segments 225 are opened to assure that the can 31 does not tend to cling to one of the segments 225 and further assure the bottom wall 33 of the embossed can is held urged against its support head 85 to enable retraction of the can 31 and indexing thereof to the ejection station 46. The air jet 265 is supplied with air from any suitable source and operates so that air is forcefully ejected therethrough in timed sequence with the outward expansion of the cylindrical segments 225.

The machine 30 is suitably driven so that its component portions cooperate to provide the desired movement of the turret 36 and the various other components associated with proper processing of cans 31 to enable embossing of cans 31 in mass production quantities generally of the order of 200 cans per minute. In particular, the drive system for the machine 30 comprises a main drive motor 267 which rotates a suitable drive such as a chain drive 268 which drives a shaft 270 extending from a gearbox 272, see FIG. 4. The gearbox 272 is connected to the drive assembly 216 by a coupling shaft 274 which is in turn connected to the gear box assembly 123 for the turret 36 by a coupling assembly 275. The assembly 216 has suitable internal linkages which drive the actuating arm 215 once a particular head assembly 40 is indexed into position at the embossing station 45 in the manner previously described.

The machine 30 also has a jack shaft 276 provided with one end suitably operatively connected to gearbox 272 and its opposite end operatively connected to another gearbox 280. The shaft 276 has a toothed sprocket wheel 281 suitably fixed thereto and a chain drive 282 is provided which engages a sprocket wheel 283 of the sprocket assembly 255 which is fixed to the shaft 246 which drives the ring gear 235 through gear 242 and provides the motive force for moving the cylindrical segments 225 radially inwardly and outwardly in the manner previously described.

The sprocket assembly 255 has another sprocket wheel 284 suitably fixed thereto and the wheel 284 drives another sprocket assembly 185 through the use of a sprocket chain 286 which engages one sprocket wheel 287 of the assembly 285. The sprocket assembly 185 is fixed to a shaft 288 which is suitably rotatably supported by the structural portion 75 and which drives the eccentric cam 83. The assembly 285 has another sprocket wheel 290 which drives a drive chain 291 and the chain 291 rotates the sprocket 185 which is used to rotate the shaft 183 comprising rotary positioning device 156.

The machine 30 has another shaft 293 which is operatively connected to the gearbox 280. The upper end of the shaft 293 is coupled to the shaft 66 by a coupling 295 and the shaft 66 carries the pulley 65 which is used to drive the screw conveyor 53.

From the above description it will be apparent that the various component portions of the machine 30 are driven by the main drive motor 267 through a drive system which provides positive precise movement of all of such component portions. Further, the various component portions are moved in a synchronized manner to enable high-speed embossing of cans 31.

Having presented a detailed description of the construction and operation of the component portions of the machine 30 the specification will now proceed with a general description highlighting the unique apparatus and method employed in embossing cans 31 in mass production quantities and with optimum simplicity. For this description particular reference is made first to FIG. 6 and then to other figures as will be pointed out during this description.

Each can 31 to be embossed is fed in a positive manner to the infeed station 42 and received on the supporting cradle 70 with an associated head assembly 40 arranged in axial alignment therewith and as seen in FIG. 7. At the infeed station 42 vacuum is applied to the support head 85 and simultaneously air under pressure is ejected against the inside surface of the bottom wall 32 of the associated can so that the can is urged against the support head 85 and held by vacuum thereagainst in a cantilevered manner as illustrated in FIG. 8 whereupon the cradle 70 is moved away by the action of its eccentric cam 83 to enable the head assembly 40 and can 31 just introduced thereon to be indexed to the rotary positioning station 43.

At the rotary positioning station the can 31 is engaged and rotated by the rotating device 156 until a predetermined speed is reached whereupon a photoelectric detector 199 is energized and detects the registration mark 198 provided on the sidewall 33 of the can 31, see FIG. 9. The detector 199 provides a signal to the motor and brake assembly 174 comprising the device 156 to substantially instantaneously stop rotation of the can whereby the can will in practically all instances be at the desired rotary position. The rotating device 156 is then moved clear of the can 31 and the now positioned can is indexed to the inspection station 44.

Another photoelectric detector 201 may be provided at the inspection station 44 to determined if the registration mark 198 is at the proper position, see FIG. 10. If the mark is not at the proper position, i.e., detector 201 will not detect it, an ejection nozzle 203 provided at station 44 ejects air under pressure against the can 31 and propels it into a chute 202 whereby the can may be subsequently reintroduced into the machine 30.

If the can 31 is properly positioned the detector 201 detects the mark 198 and the can 31 is then indexed to the embossing station 45 and arranged opposite the embossing device 205, see FIG. 11. The head assembly 40 is then telescoped toward the embossing device 205 to thereby move the associated can into operative association with the device 205 to enable embossing thereof.

Once the embossing has been completed the embossed can 31 is retracted by its head 40 and indexed to the ejection station 46 (see FIG. 12) at which location air under pressure supplied through the passage 114 in the support head 85 will release the vacuum on the can. Substantially simultaneously with release of the vacuum a jet of air is ejected forcibly against the sidewall of the can by a nozzle 222 to eject the can into the discharge chute 224.

The apparatus and method of this invention enables the embossing of cans 31 in mass production quantities by holding such cans utilizing vacuum means acting against the bottom wall 32 of each particular can whereby the sidewall 33 thereof is unobstructed and the embossing action may be achieved in an efficient manner. Further, it will be appreciated that while vacuum means has been utilized to hold each can 31 in position on its head assembly 40 any other suitable means may be utilized. For example, if the can were to have a bottom wall made of a ferrous material electromagnetic means might be utilized. Also, suitable mechanical means might be used to grasp the peripheral flange provided at one end of a can body.

In this example of the invention the rotary positioning device 145 has been utilized to enable rotary positioning of a particular can 31 and enable the embossed pattern to be placed on its sidewall at the desired position. However, in those applications where it is not necessary to precisely place an embossed pattern on the sidewall the entire rotary positioning device may be eliminated whereby the apparatus and method of this invention would enable high-speed embossing of cans with great precision and in greater quantities per minute than the quantities mentioned herein.

The embossing action is provided by the device 205 in this example of the invention with the energy source on the inside of each can and a female die assembly around the can; however, it is to be understood that, if desired, a suitable collapsible die may be placed within each can to be shaped and the energy source provided adjacent the exterior of such can.

The cans 31 processed by the machine 30 are shown as single-piece cans which have a bottom wall 32 and sidewalls 33 which are made as one integral part. However, it will be appreciated that the apparatus and method of this invention may be effectively utilized to process cans made of a plurality of parts and may be utilized to process cans having a cylindrical sidewall which is fastened together along a conventional longitudinal seam and a portion of such seam may be effectively utilized as a registration mark if desired.

The machine 30 is provided with an infeed 50 comprised of an inlet chute and a screw conveyor assembly 52; however, it will be appreciated that any suitable infeed system may be provided and such infeed system may comprise one or more infeed star wheels, for example.

While present exemplary embodiments of this invention, and methods of practicing the same, have been illustrated and described, it will be recognized that this invention may be otherwise variously embodied and practiced by those skilled in the art.

What is claimed is:

1. An apparatus for shaping workpieces comprising, a turret supporting a plurality of head assemblies for orbiting movement in an indexing manner about a central axis, means for holding a workpiece on each of said head assemblies in a substantially cantilevered manner, a shaping device, said shaping device being supported in position at a shaping station and each of said assemblies being indexed into position at said shaping station by said turret, and means for moving each of said head assemblies so that its workpiece is brought into operative association with said shaping device to enable shaping thereof, said moving means engages each assembly as it is indexed into position adjacent said shaping station and moves each assembly substantially parallel to said central axis thereby moving the associated workpiece into said operative association, said shaping device shaping the entire workpiece area which is to be shaped in a substantially simultaneous manner with the workpiece held stationary.

2. An apparatus as set forth in claim 1 in which said holding means comprises a support head on each of said head assemblies having an outer surface against which an associated workpiece is held in said cantilevered manner, a fluid passage through said support head, and a fluid system comprising a vacuum line connecting said passage with an associated vacuum source to hold said workpiece against said outer surface by vacuum until after it is shaped by said shaping device.

3. An apparatus as set forth in claim 2 in which said fluid system comprises a pressure line connecting said passage with an associated source of fluid under pressure to help release each workpiece from its associated head following shaping thereof by said shaping device.

4. An apparatus as set forth in claim 2 and further comprising a device for ejecting each shaped workpiece from said apparatus.

5. An apparatus as set forth in claim 1 in which said holding means comprises a rotatable support head on each of said assemblies which provide the sole support for an associated workpiece having a registration mark thereon and further comprising a device for rotating said support head and its workpiece and a detector for detecting said mark during rotation of said workpiece, said detector being operatively connected to said rotating device to stop rotation thereof and of said support and thereby position said workpiece in the desired position to enable subsequent shaping thereof.

6. An apparatus as set forth in claim 5 in which said detector comprises a photoelectric detector.

7. Apparatus as set forth in claim 1 and further comprising an infeed for serially feeding said workpieces on said apparatus, said infeed comprising a cradle adapted to support each particular workpiece at an infeed station past which each head assembly is orbited to enable the particular workpiece to be picked up by the holding means of an associated head.

8. An apparatus for shaping workpieces comprising, a turret supporting a plurality of head assemblies for orbiting movement about a central axis, means for holding a workpiece on each of said head assemblies, said holding means comprising a rotatable support head on each of said assemblies which supports an associated workpiece having a registration mark thereon, a device for rotating said support head and its workpiece, a detector for detecting said mark during rotation of said workpiece, said detector being operatively connected to said rotating device to stop rotation thereof and of said support and thereby position said workpiece in the desired position to enable subsequent shaping thereof, a shaping device, and means for moving each of said head assemblies so that its workpiece is brought into operative association with said shaping device to enable shaping thereof, said rotating device operating to rotate said workpiece and bring it up to a predetermined speed whereupon said detector is energized to detect said mark and then stop rotation of said rotating device to thereby assure said workpiece is stopped at the desired position, and a second detector arranged downstream of said first-named detector for inspecting whether said workpiece is in the desired position, said second detector being operatively connected to a workpiece-ejecting device to eject each improperly positioned workpiece from said apparatus.

9. An apparatus for shaping workpieces comprising, a turret supporting a plurality of head assemblies for orbiting movement about a central axis, means for holding a workpiece on each of said head assemblies, said holding means comprising a rotatable support head on each of said assemblies which supports an associated workpiece having a registration mark thereon, a device for rotating said support head and its workpiece, a detector for detecting said mark during rotation of said workpiece, said detector being operatively connected to said rotating device to stop rotation thereof and of said support and thereby position said workpiece in the desired position to enable subsequent shaping thereof, a shaping device, and means for moving each of said head assemblies so that its workpiece is brought into operative association with said shaping device to enable shaping thereof, each head assembly comprising an axially movable shaft having an associated support head fixed to its outer end and having a bearing surface normally held yieldingly urged against a cooperating surface to prevent rotation of said shaft and support head, said rotating device operating to move said bearing surface away from said cooperating surface to enable rotation of said workpiece.

10. An apparatus as set forth in claim 9 in which said rotating device has a plate defining its terminal outer end which is supported for axial movement along its axis of rotation and further comprising a mechanism for axially moving said plate against said end portion of said workpiece to thereby move said bearing surface away from said cooperating surface.

11. An apparatus as set forth in claim 10 in which said mechanism comprises a pivoted arm having one end operatively associating with a rotatable cam and its opposite end operatively associating with said plate to precisely control the axial movement of said plate.

12. An apparatus for shaping workpieces comprising, a turret supporting a plurality of head assemblies for orbiting movement about a central axis, means for holding a workpiece on each of said head assemblies, an infeed for serially feeding said workpieces on said apparatus, said infeed comprising a cradle adapted to support each particular workpiece at an infeed station past which each head assembly is orbited to enable the particular workpiece to be picked up by the holding means of an associated head, said cradle being supported for pivoting movement and said infeed further comprising a cam which operatively associates with said cradle to pivot said cradle out of the rotary path of each workpiece once the workpiece has been pickup up by an associated holding means, a shaping device, and means for moving each of said head assemblies so that its workpiece is brought into operative association with said shaping device to enable shaping thereof, said shaping device shaping the entire workpiece area which is to be shaped in a substantially simultaneous manner with the workpiece held stationary.

13. An apparatus for shaping workpieces comprising, a turret supporting a plurality of read assemblies for orbiting movement about a central axis, said turret supports said head assemblies for orbiting movement in an indexing manner, means for holding a workpiece on each of said head assemblies, a shaping device, said shaping device being supported in position at a shaping station and each of said assemblies being indexed into position as said shaping station by said turret, and means for moving each of said head assemblies so that its workpiece is brought into operative association with said shaping device to enable shaping thereof, said moving means comprising an actuator which engages each assembly as it is indexed into position and moves each assembly substantially parallel to said central axis thereby moving the associated workpiece into said operative association, said shaping device shaping the entire workpiece area which is to be shaped in a substantially simultaneous manner with the workpiece held stationary.

14. An apparatus as set forth in claim 13 in which said shaping device comprises an embossing device.

15. An apparatus as set forth in claim 13 in which said shaping device comprises an embossing device which has an automatic radially expandible and contractable female die assembly which is expanded automatically to receive each workpiece therewithin and said actuator comprises an arm which has an outer swinging end which engages the rear end portion of each head assembly and moves the associated workpiece into said operative association with said embossing device and away from said embossing device following embossing thereof.

16. An apparatus for shaping workpieces comprising, a turret supporting a plurality of head assemblies for orbiting movement about a central axis in an indexing manner, means for holding a workpiece on each of said head assemblies, a shaping device, and means for moving each of said head assemblies so that its workpiece is brought into operative association with said shaping device to enable shaping thereof, said shaping device being supported in position at a shaping station and each of said assemblies being indexed into position at said shaping station by said turret, said moving means comprising an actuator which engages each assembly as it is indexed into position and moves each assembly substantially parallel to said central axis thereby moving the associated workpiece into said operative association, said shaping device comprising an embossing device which has an expandible female die assembly which is expanded to receive each workpiece therewithin and said actuator comprises an arm which has an outer swinging end which engages the rear end portion of each head assembly and moves the associated workpiece into said operative association with said embossing device and away from said embossing device following embossing thereof, said female die assembly comprising a plurality of cooperating cylindrical segments having integral means defining an embossing pattern, said segments having their longitudinal axes arranged substantially parallel to said central axis and each of said segments being movable radially inwardly and outwardly along an associated radially extending track by a cam roller attached to the associated segment and being engaged by a rotatable cam track.

17. An apparatus for embossing substantially tubular workpieces comprising, a turret supporting a plurality of head assemblies for orbiting movement in an indexing manner about a central axis, a drive for indexing each head assembly to a plurality of stations including an infeed station and an embossing station, an infeed for feeding a workpiece on each head assembly as said infeed station, means for holding a workpiece on each of said head assemblies in a substantially cantilevered manner, an embossing device at said embossing station, and means for moving each of said head assemblies so that its workpiece is brought into operative association with said embossing device to enable embossing thereof, said moving means engages each assembly as it is indexed into position adjacent said embossing station and moves each assembly substantially parallel said central axis thereby moving the associated workpiece into said operative association, said embossing device embossing the entire workpiece area which is to be embossed in a substantially simultaneous manner with the workpiece held stationary.

18. An apparatus as set forth in claim 17 in which said tubular workpieces comprise cans each having a bottom wall adjoined by a tubular sidewall which terminates in an open end, said holding means comprises a support head on each of said head assemblies and having an outer surface against which the bottom wall of an associated can is held, a fluid passage through said support head, and a fluid system comprising a vacuum line connecting said passage with an associated vacuum source to hold said can in said cantilevered manner against said outer surface by a vacuum until after it is embossed by said embossing device.

19. An apparatus as set forth in claim 18 in which said fluid system comprises an air system having a pressure line connecting said passage with an associated source of air under pressure to help release each can from its associated head following embossing thereof by said embossing device.

20. An apparatus as set forth in claim 18 and further comprising means for ejecting each embossed can from said apparatus, said ejecting means comprising an air jet which is directed forcefully against said can to propel said can into an associated receptacle.

21. An apparatus as set forth in claim 18 in which said plurality of stations comprises a rotary positioning station, said holding means comprises a rotatable support head on each of said assemblies which supports an associated can having a registration mark thereon, and further comprising a device for rotating said support head and its can at said rotary positioning station and a detector for detecting said mark during rotation of said can, said detector being operatively connected to said rotating device to stop rotation thereof and said support and thereby position said can in the desired position to enable subsequent precise embossing thereof.

22. An apparatus for embossing substantially tubular workpieces comprising, a turret supporting a plurality of head assemblies for orbiting movement in an indexing manner about a central axis, a drive for indexing each head assembly to a plurality of stations including an infeed station, a rotary positioning station, an inspection station and an embossing station, an infeed for feeding a workpiece on each head assembly as said infeed station, means for holding a workpiece on each of said head assemblies, an embossing device at said embossing station, means for moving each of said head assemblies so that its workpiece is brought into operative association with said embossing device to enable embossing thereof, said tubular workpieces comprising cans each having a bottom wall adjoined by a tubular sidewall which terminates in an open end, said holding means comprising a support head on each of said head assemblies and having an outer surface against which the bottom wall of an associated can is held, a fluid passage through said support head, a fluid system comprising a vacuum line connecting said passage with an associated vacuum source to hold said can in a cantilevered manner against said outer surface by a vacuum until after it is embossed by said embossing device, said holding means comprising a rotatable support head on each of said assemblies which supports an associated can having a registration mark thereon, a device for rotating said support head and its can at said rotary positioning station, a detector for detecting said mark during rotation of said can, said detector being operatively connected to said rotating device to stop rotation thereof and said support and thereby position said can in the desired position to enable subsequent precise embossing thereof, said detector comprising a photoelectric detector, said registration mark comprising a mark placed on the sidewall of its associated can which is capable of being detected by said photoelectric detector, said rotating device operating to rotate said can and bring it up to a predetermined speed whereupon said photoelectric detector is energized to detect said mark and then stop rotation of said rotating device following detection thereof to thereby assure said can is stopped at the desired position, and a second photoelectric detector arranged downstream of said first-named detector and at said inspection station for inspecting whether each can is in the desired position, said second detector being operatively connected with a can ejecting device to eject each improperly positioned can from said apparatus.

23. An apparatus for embossing substantially tubular workpieces comprising, a turret supporting a plurality of head assemblies for orbiting movement in an indexing manner about a central axis, a drive for indexing each head assembly to a plurality of stations including an infeed station, a rotary positioning station, an inspection station and an embossing station, an infeed for feeding a workpiece on each head assembly at said infeed station, means for holding a workpiece on each of said head assemblies, an embossing device as said embossing station, means for moving each of said head assemblies so that its workpiece is brought into operative association with said embossing device to enable embossing thereof, said tubular workpieces comprising cans each having a bottom wall adjoined by a tubular sidewall which terminates in an open end, said holding means comprising a support head on each of said head assemblies and having an outer surface against which the bottom wall of an associated can is held, a fluid passage through said support head, a fluid system comprising a vacuum line connecting said passage with an associated vacuum source to hold said can in a cantilevered manner against said outer surface by a vacuum until after it is embossed by said embossing device, said holding means comprising a rotatable support head on each of said assemblies which supports an associated can having a registration mark thereon, a device for rotating said support head and its can at said rotary positioning station, a detector for detecting said mark during rotation of said can, said detector being operatively connected to said rotating device to stop rotation thereof and said support and thereby position said can in the desired position to enable subsequent precise embossing thereof, each head assembly comprising an axially movable shaft having an associated support head fixed to its outer end and having a bearing surface normally held yieldingly urged against a cooperating surface to prevent rotation of said shaft and support head, said rotating device operating to engage the outer edge of the sidewall of an associated can to move said bearing surface away from said cooperating surface to enable rotation of the associated can.

24. An apparatus as set forth in claim 23 in which said rotating device has a plate defining its terminal outer end which is supported for axial movement along its axis of rotation and further comprising a mechanism for axially moving said plate against said outer edge.

25. An apparatus for embossing substantially tubular workpieces in the form of cans each having a bottom wall adjoined by a tubular sidewall which terminates in an open end, said apparatus comprising, a turret supporting a plurality of head assemblies for orbiting movement in an indexing manner about a central axis, a drive for indexing each head assembly to a plurality of stations including an infeed station and an embossing station, an infeed for feeding a workpiece on each head assembly at said infeed station, means for holding a workpiece on each of said head assemblies in a substantially cantilevered manner, said holding means comprising a support head on each of said head assemblies and having an outer surface against which the bottom wall of an associated can is held, a fluid passage through said support head, an embossing device at said embossing station, means for moving each of said head assemblies so that its workpiece is brought into operative association with said embossing device to enable embossing thereof, and a fluid system comprising a vacuum line connecting said fluid passage with an associated vacuum source to hold said can in said cantilevered manner against said outer surface by a vacuum until after it is embossed by said embossing device, said embossing device embossing the entire workpiece area which is to be embossed in a substantially simultaneous manner with the workpiece held stationary, said infeed comprising a cradle adapted to momentarily support and position each particular can at said infeed station past which each head assembly is orbited to enable the particular can to be picked up by the holding means of an associated head, said cradle being supported for pivoting movement and said infeed further comprising an air nozzle adapted to eject air against the inside surface of the bottom wall of each can to help urge each can against an associated holding means and a cam which operatively associates with said cradle to pivot said cradle out of the rotary path of each can once the can has been picked up by an associated holding means.

26. An apparatus for embossing substantially tubular workpieces comprising, a turret supporting a plurality of head assemblies for orbiting movement in an indexing manner about a central axis, a drive for indexing each head assembly to a plurality of station including an infeed station and an embossing station, an infeed for feeding a workpiece on each head assembly as said infeed station, means for holding a workpiece on each of said head assemblies in a substantially cantilevered manner, an embossing device at said embossing station, and means for moving each of said head assemblies so that its workpiece is brought into operative association with said embossing device to enable embossing thereof, each of said assemblies being indexed into position at said embossing station by said turret and said moving means comprising an actuator which engages each assembly as it is indexed into position and moves each assembly in a rectilinear path substantially parallel to said central axis thereby moving the associated can in position to enable said operative association, said embossing device embossing the entire workpiece area which is to be embossed in a substantially simultaneous manner with the workpiece held stationary.

27. An apparatus as set forth in claim 26 in which said embossing device comprises an automatic radially expandible and contractable female die assembly which is automatically expanded to receive each can therewithin and is automatically contracted around the sidewall of each can to enable embossing thereof and further comprising means instantaneously urging said sidewall radially outwardly against said die assembly to achieve said embossing.

28. A method of shaping substantially tubular workpieces comprising the steps of, infeeding a plurality of workpieces on a plurality of head assemblies provided on a turret which is rotatable in an indexing manner about a central axis to a plurality of stations including a shaping station and an ejection station, holding each of said workpieces on its associated head assembly in a substantially cantilevered manner, indexing each of said head assemblies and its associated workpiece to a position adjacent and spaced from said shaping station by rotating said turret in said indexing manner, moving each assembly from its position adjacent said shaping station substantially parallel said central axis to move the associated workpiece into operative association with a shaping device at said shaping station, shaping each workpiece at said shaping station by shaping the entire area thereof which is to be shaped in a substantially simultaneous manner with the workpiece held stationary, and ejecting each workpiece at said ejection station.

29. A method as set forth in claim 28 in which said infeeding step comprises placing each of said workpieces on a cradle past which each head assembly is orbited, and positioning said cradle once a particular workpiece has been fed on a head assembly to enable said orbiting thereof without obstruction by said cradle.

30. A method as set forth in claim 28 in which said plurality of stations comprises a rotary positioning station and comprising the further step of rotary positioning said workpiece after indexing thereof to said rotary positioning station, said rotary positioning being achieved with each workpiece held firmly on its head assembly.

31. A method as set forth in claim 30 in which said rotary positioning step comprises rotating said workpiece to bring it up to a predetermined speed, energizing an associated photoelectric detector used to detect a registration mark on said workpiece, and stopping rotation of said rotating device and hence said workpiece following detection of said mark to thereby assure said workpiece is stopped at the desired position.

32. A method as set forth in claim 28 in which said plurality of workpieces comprises a plurality of cans each having a bottom wall, a sidewall, and an open end, said holding step comprises holding each can in said cantilevered manner by vacuum acting against its bottom wall, said moving step comprises the step of axially telescoping each can parallel to said central axis into said operative association, and said shaping step comprises the step of embossing the cylindrical sidewall of each can with an embossing device at said shaping station, said embossing being achieved in said substantially simultaneous manner.

33. A method as set forth in claim 32 in which said embossing step comprises the step of forcefully urging the sidewall of each can outwardly against automatically radially collapsible and expandible female die means comprising said embossing device to provide a desired embossed pattern thereon, said die means being automatically collapsed to enable the embossing action to take place and being automatically expanded to enable removal of the can from within said die means.

24. A method of shaping substantially tubular workpieces comprising the steps of, infeeding a plurality of workpieces on a plurality of head assemblies provided on a rotatable turret, holding each of said workpieces on its associated head assembly in a substantially cantilevered manner, orbiting said read assemblies and workpieces by rotating said turret about a central axis and in an indexing manner to a plurality of stations including a shaping station and an ejection station, shaping each workpiece at said shaping station by shaping the entire area thereof which is to be shaped in a substantially simultaneous manner with the workpiece held stationary, ejecting each workpiece at said ejection station, said infeeding step comprising placing each of said workpieces on a cradle past which each head assembly is orbited, and comprising the further step of positioning said cradle once a particular workpiece has been fed on a head assembly to enable said orbiting of said head assemblies without obstruction by said cradle, said positioning step comprising pivoting said cradle using cam means which is operated in timed sequence with a drive for said turret.

* * * * *